US008190784B1

(12) United States Patent
Raizen et al.

(10) Patent No.: US 8,190,784 B1
(45) Date of Patent: May 29, 2012

(54) IN-BAND TRANSPORT MECHANISM FOR CARRYING COMMUNICATIONS AMONG FUNCTIONAL COMPONENTS OF A STORAGE I/O INTERFACE STACK

(75) Inventors: Helen S. Raizen, Jamaica Plain, MA (US); Michael E. Bappe, Loveland, CO (US); Edith Epstein, Arlington, MA (US); Atul Kabra, New Delhi (IN); Cesareo Contreras, Northbridge, MA (US); Xunce Zhou, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/076,056

(22) Filed: Mar. 30, 2011

(51) Int. Cl.
G06F 3/00 (2006.01)
G06F 13/42 (2006.01)
G06F 13/14 (2006.01)

(52) U.S. Cl. .............................. 710/5; 710/105; 710/305
(58) Field of Classification Search ........................ None
See application file for complete search history.

(56) References Cited

U.S. PATENT DOCUMENTS

2002/0143986 A1* 10/2002 Hale et al. ..................... 709/238
2002/0161919 A1* 10/2002 Boucher et al. ............... 709/238
2005/0022143 A1* 1/2005 Butts et al. ......................... 716/5
2007/0067497 A1* 3/2007 Craft et al. .................... 709/250

* cited by examiner

*Primary Examiner* — Henry Tsai
*Assistant Examiner* — Kris Rhu
(74) *Attorney, Agent, or Firm* — BainwoodHuang

(57) ABSTRACT

An in-band protocol transport carries command-response protocol communications between first and second functional components of a storage input/output (I/O) interface stack, for example to control encryption-related processing of storage I/O commands. A storage read command used as a protocol transport message has protocol data in a read data buffer, and predetermined read address information, such as a prime-numbered starting block address and a small, odd-valued length value, unlikely to occur in normal (non-transport) storage read commands. The second functional component determines that the storage read command contains the predetermined read address information, indicating that the storage read command is a protocol transport message rather than a normal read. For greater confidence, it also determines that the protocol data in the read data buffer includes protocol identification data such as a protocol signature. The protocol data is used to control a processing action for subsequent normal storage I/O commands, such as encryption-related processing, and a protocol response is returned by creating and storing response data in the read data buffer and signaling completion of the storage read command to the first functional component.

36 Claims, 10 Drawing Sheets

IN-BAND TRANSPORT MECHANISM FOR CARRYING COMMUNICATIONS AMONG FUNCTIONAL COMPONENTS OF A STORAGE I/O INTERFACE STACK

BACKGROUND

The present invention is related to the field of data processing, in particular to storage-related operation of data processing systems.

In data processing systems, it is known to utilize a stack of input/output (I/O) functional components or drivers in a host computer to realize an interface to an external data storage system. The functional components of an I/O interface stack generally perform different types of functions at different logical layers in a coordinated fashion in order to obtain all the desired functionality of the interface. As an example, a high-level I/O driver may interact with a so-called "multipathing" driver that has knowledge of multiple distinct paths to storage devices and that uses the knowledge to distribute storage I/O commands among the different paths in a way that improves performance or achieves other system goals (such as enhanced availability). The multipathing driver in turn relies one or more lower-level drivers that control the operation of a host bus adapter providing a hardware-level interface to a storage-oriented interconnect bus that connects the host computer to the storage system.

SUMMARY

In data processing systems employing I/O interface stacks such as described above, it can be useful or necessary for two or more functional components of a stack to communicate with each other. In the context of storage-related operations, for example, a host computer may provide support for encryption of storage data. If the encryption is performed at a low level (e.g., by a host bus adapter) while the management of encryption keys and other encryption-related information and processing is performed at a higher level (e.g., at a key controller module residing at a higher level of the I/O interface stack), then some amount of communications among the levels is necessary so that the higher-level entity (key controller module) can pass the encryption keys and/or other encryption-related information to the lower-level entity (host bus adapter). This is only one example of the usefulness of communications among the functional components of an I/O interface stack.

In any scheme for communication among functional components of an I/O interface stack, it is necessary to utilize some type of transport mechanism for carrying the communications. The transport mechanism is generally distinct from the architecture and content of the communications protocol which conveys the desired information. As an example, a communications protocol may be a command-response protocol in which an initiator generates a protocol-defined command and a responder responds with a protocol-defined response. The transport mechanism is the mechanism used to convey the command from the initiator to the responder and the response from the responder to the initiator. A variety of general transport mechanisms are known, including for example memory-based rings and queues. One distinction among transport mechanisms is between a so-called "out of band" mechanism, which employs a datapath and signaling separate from those used for operational functions (e.g., for processing storage read and write commands), and an "in-band" mechanism that utilizes the same datapath and signaling used to carry out those functions.

A method of operating a computer connected to a storage device is disclosed in which a command-response communications protocol is employed between first and second functional components of a storage input/output (I/O) interface stack of the computer. The command-response protocol includes exchange of protocol data used to control processing of storage I/O commands by the second functional component. The protocol data also includes identification data identifying the protocol data as data of the command-response protocol.

The method includes use of an in-band transport mechanism as follows. At the first functional component, a storage read command is created as a protocol transport message in a memory of the computer. The storage read command is directed to the storage device and includes a read command data structure and a read data buffer specifically associated therewith. The read data buffer includes first protocol data constituting a protocol command, and the read command data structure includes a storage read command and predetermined read address information used to identify the storage read command as the protocol transport message. In one embodiment, the predetermined read address information may include a prime-numbered starting block address and a small, odd-valued length value, which are very unlikely to occur in normal (non-transport) storage read commands.

At the second functional component, the read command data structure is accessed from the memory and it is tested to make a first determination that it contains the predetermined read address information. This is an indication (to a high confidence) that the storage read command is a protocol transport message rather than a normal storage read message. Based on the first determination, the read data buffer is accessed from the memory and it is tested to make a second determination that it includes the identification data. This second determination increases the confidence that the storage read command is the protocol transport message and not a normal read command that happens to be using address information which matches the predetermined address information.

Based on the second determination and the protocol data in the read data buffer, the second functional component (a) executes a protocol-controlled processing action with respect to subsequent normal storage I/O commands, and (b) returns a protocol response to the first functional component by creating and storing response data in the read data buffer and signaling a completion of the storage read command to the first functional component. The storage read command is not sent to the storage device. In one embodiment, the command-response protocol may be a data encryption key management protocol used to provide a data encryption key and other encryption-related data to the second functional component, and the protocol-controlled process action includes encryption and decryption of data of the storage I/O commands using data encryption key and encryption-related data provided by the first functional component.

The in-band transport mechanism can provide advantages over other transport mechanisms, especially for processing of storage I/O commands and for encryption-related processing in particular. By its use of a storage read command and response, it can provide for independence from the details of any particular hardware or software platform on which it may operate. Whatever mechanism is already used in a given platform for generating and signaling normal storage read commands and responses can readily be used as part of the transport mechanism for the command-response protocol also. The transport mechanism also has a desirable feature of automatically flowing down and back up an I/O interface stack, regardless of the exact constitution of the stack. Thus, it can automatically support the presence (or absence) of intermediate layers that might need to examine and in some cases even alter the flow of the protocol communications. Specific examples of such intermediate layers are discussed below.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The description herein provides numerous details regarding a particular use and operating environment for an in-band communications transport mechanism in a host computer. Specifically, the transport mechanism is disclosed in the context of a distributed computer system that provides encrypted data storage, with the transport mechanism carrying a data encryption key management protocol that is used to control encryption-related processing in various functional components of the system. The transport mechanism can provide certain benefits in this kind of operating environment. However, the transport mechanism has a more general nature and is capable of use in other applications or environments, and the description herein is not to be taken as unnecessarily limiting.

Figure 1:
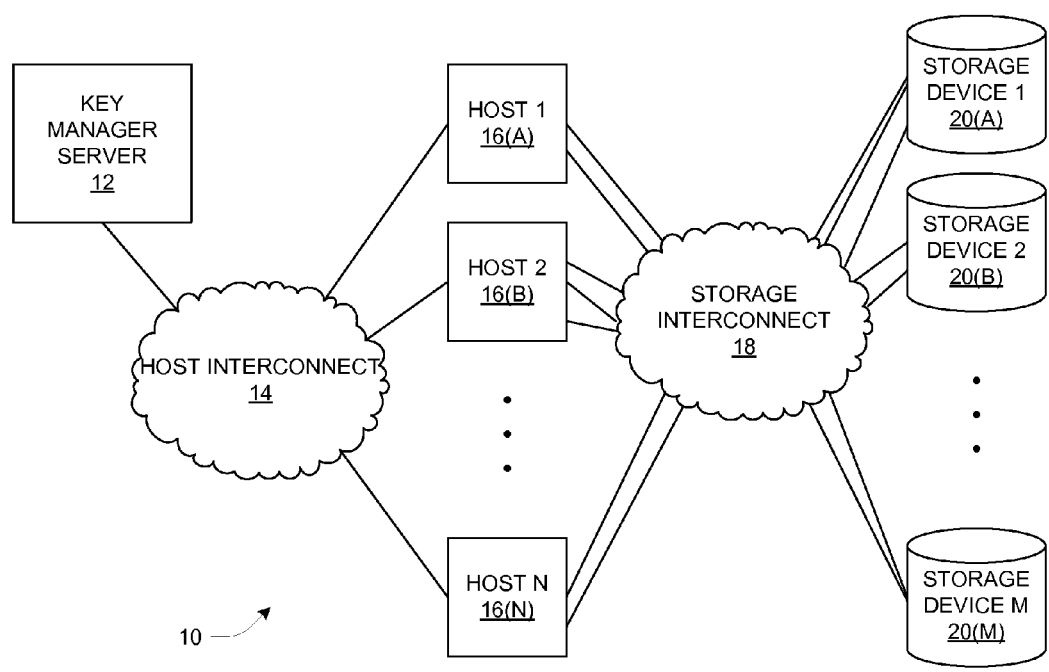
FIG. 1 depicts an example system for use in practicing various embodiments of the invention.

FIG. 1 depicts an example distributed computer system 10 (capable of performing as an encrypted data storage system) for use in performing various embodiments of the invention. System 10 includes a key manager server 12, a host interconnect 14, and one or more hosts 16 (depicted as hosts 16(a), 16(b), . . . , 16(n)). Key manager server 12 and hosts 16 connect to each other via host interconnect 14. The hosts 16 also connect to storage devices 20 (depicted as storage devices 20(a), 20(b), . . . , 20(m)) via a storage interconnect 18. In some embodiments, the host interconnect 14 and the storage interconnect 18 are combined.

In operation, the hosts 16 execute application programs that utilize the storage devices 20 for non-volatile data storage. The storage interconnect 18 may employ a storage-oriented protocol such as iSCSI or Fibre Channel to enable block-oriented read and write commands and the accompanying data to be transferred between the hosts 16 and storage devices 20. Additionally, the system 10 provides selective encryption of storage data by the hosts 16. The key manager server 12 and host interconnect 14 provide support for the data encryption function as described in more detail below.

Key manager server 12 provides key manager functionality, i.e., the generation, protection, storage, replacement, and elimination of data encryption keys and related data that are used in data encryption/decryption operations. In one embodiment, key manager server 12 is a server appliance. One example of a key manager server 12 usable in some embodiments is the RSA Data Protection Manager appliance manufactured by EMC Corp. of Hopkinton, Mass. It should be understood that this is by way of example only; other products may also serve as the key manager server 12.

Key manager server 12 and hosts 16 connect to each other via host interconnect 14. Host interconnect 14 may be, for example, a network, such as a local area network (LAN) or a wide area network (WAN). Host interconnect 14 may also be realized by a collection of one or more switches interconnecting key manager server 12 and hosts 16.

Hosts 16 are computers executing applications that store data on the data storage devices 20. In addition to connecting to the host interconnect 14, each host 16 also connects to the storage interconnect 18, typically via a plurality of independent connections. In one embodiment, the hosts 16 employ a multipathing function which establishes and utilizes multiple paths from a given host 16 to a given storage device 20, which can provide higher performance as well as redundancy for greater availability. Further detail regarding hosts 16 is provided below in connection with FIGS. 2 and 3.

The storage interconnect 18 can be any type of network or input/output (I/O) bus capable of interconnecting storage devices 20 with host computers 16. In some embodiments, the storage devices 20 and host 16 are interconnected in a manner such that, to the operating systems running on the hosts 16, the storage devices 20 appear as locally attached, but this is not required. The storage interconnect 18 may be a shared, public, or private network and encompass a wide area or local area and can be implemented through any suitable combination of wired and/or wireless communication networks. Furthermore, the storage interconnect 18 may include a LAN, a WAN, an intranet, the Internet, or a set of switches. For example, in one embodiment, the storage interconnect 18 works with Fibre Channel connectivity and is implemented in the form of a storage area network (SAN). In another embodiment, the storage interconnect 18 works with internet protocol (IP) connectivity and is implemented via an Internet-Small Computer System Interface (iSCSI) (e.g., for Fibre Channel). Those of skill in the art will recognize that other implementations are, of course, possible.

Storage devices 20 may be any sort of storage equipment capable of connecting to storage interconnect 18. In some embodiments, each storage device 20 is a disk array. As is well-known in the art, a typical disk array includes a disk array controller, disk enclosures holding a plurality of disk drives, and a power supply. A disk array may also include a cache. Examples of disk arrays include the Symmetrix Integrated Cache Disk Array System and the CLARiiON Disk Array System, both available from EMC Corp. of Hopkinton, Mass.

As mentioned, key manager server 12 controls the generation, protection, storage, replacement, and elimination of data encryption keys. In particular, key manager server 12 creates encryption keys and corresponding key identifiers. Each key identifier, referred to as a key_id, is associated with a corresponding encryption key and can be used to obtain the key from the key manager server 12, provided that all permissions and credentials are in place.

Figure 2:
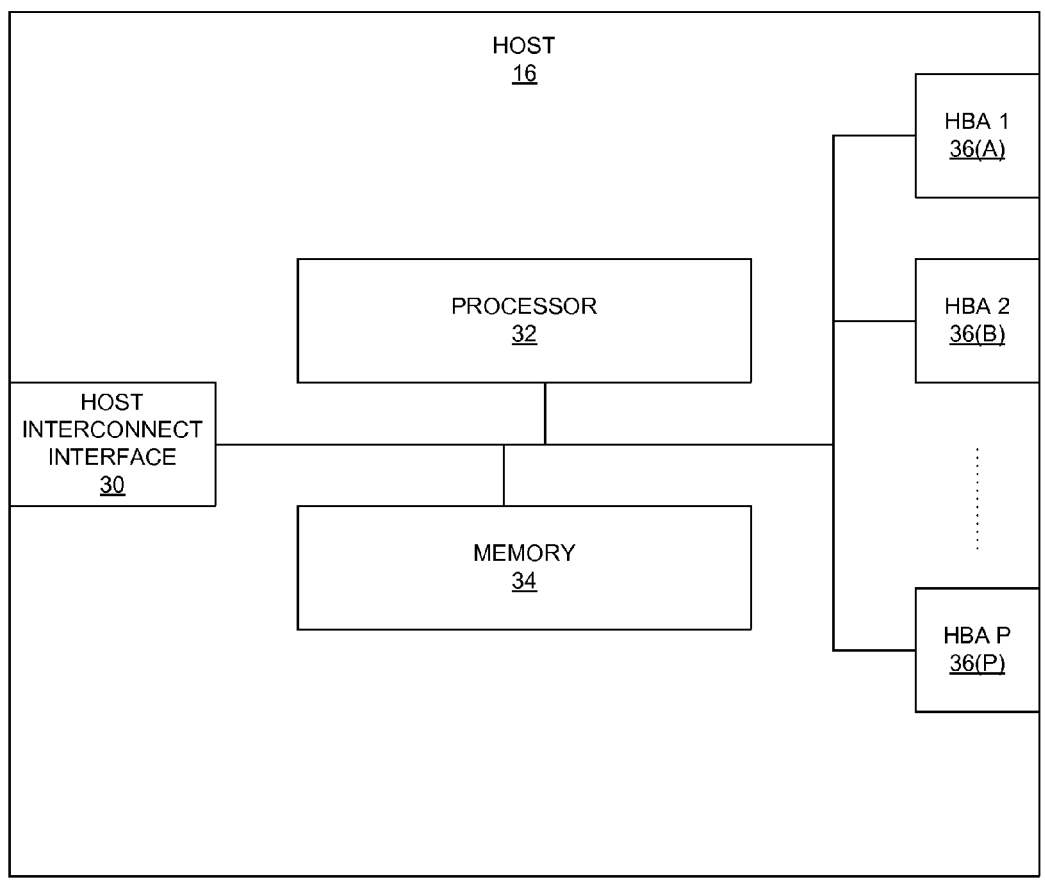
FIG. 2 depicts an example apparatus for use in practicing various embodiments of the invention.

FIG. 2 depicts a host 16 in greater detail. Each host 16 includes a host interconnect interface 30 for connecting to host interconnect 14, a processor 32, memory 34, and one or more host bus adapters (HBA) 36 (depicted as HBAs 36(A), 36(B), . . . , 36(P)) for connecting to storage interconnect 18 over redundant paths. Processor 32 may be any sort of controller, such as, for example, a general purpose processor or microprocessor, a central processing unit, a set of multiple processing units, or a set of dedicated circuitry designed to perform particular operations in hardware. Memory 34 may be made up of one or more of the following: volatile random access memory, non-volatile read-only memory, non-volatile flash memory, magnetic storage, optical storage, etc. In some embodiments, one or more of the HBAs 36 are "encrypting" HBAs that perform encryption and decryption of storage data using dedicated hardware-level circuitry which is not shown in FIG. 2.

Figure 3:
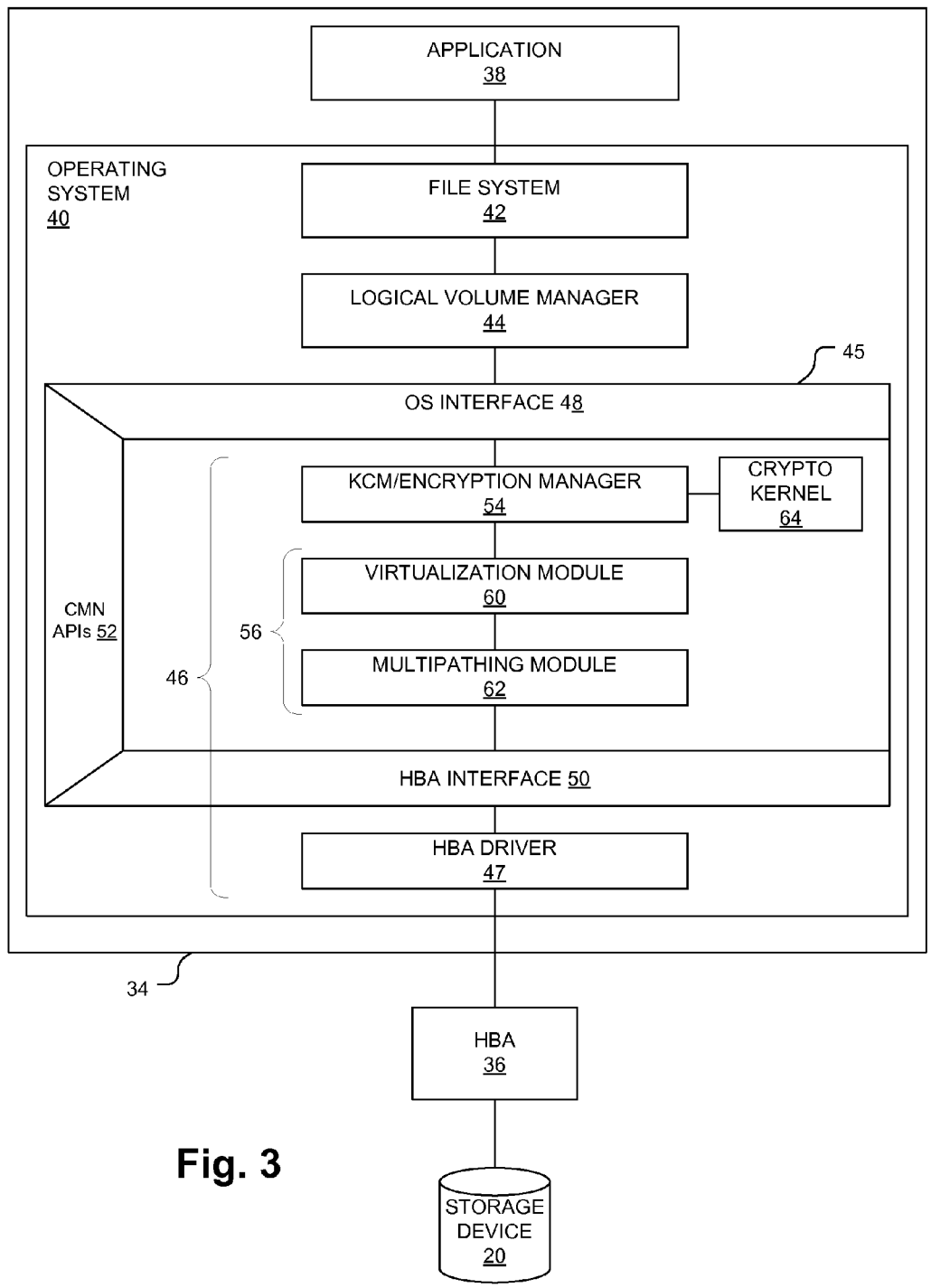
FIG. 3 depicts an arrangement of various components for use in practicing various embodiments of the invention.

FIG. 3 illustrates certain software that is contained within the memory 34 during system operation. As shown, in one embodiment, memory 34 stores one or more computer program applications 38 and an operating system (OS) 40. Applications 38 and OS 40 contain a set of instructions to be executed by processor 32. Memory 34 may also store application data.

OS 40 (which contains many well-known components that are not shown or described herein) includes a file system 42 and a logical volume manager 44. OS 40 also includes an input/output (I/O) filter driver 45 and an HBA driver 47. I/O filter driver 45 may be, for example, a component of the PowerPath Encryption With RSA software available from EMC Corp. of Hopkinton, Mass. I/O filter driver 45 includes an OS interface 48, an HBA interface 50, and a set of common application programming interfaces (CMN APIs) 52. I/O filter driver 45 also includes a key controller module (KCM) or encryption manager 54 and one or more intermediate layers (IL) 56. ILs 56 may include, for example, one or more virtualization modules 60 and multipathing modules 62. Crypto kernel 64 may also be considered to be part of I/O filter driver 45. Portions of the I/O filter driver 45 and the HBA driver 47 may also make up storage I/O stack 46. It should be understood that this arrangement is by way of example only; in some embodiments, one or more components of the storage I/O stack 46 may be external to the I/O filter driver 45. In any case, for purposes of this disclosure, the storage I/O stack 46 includes components between the KCM 54 and a software interface to an encryption endpoint (EE) where encryption is performed (e.g., between KCM 54 and HBA driver 47).

The KCM 54 is generally responsible for managing the data encryption aspects of operation of the host 16 in which it resides. In some arrangements, the KCM 54 may arrange for the encryption to be performed by crypto kernel 64. However, since KCM 54 and crypto kernel 64 both run in software (running on processor 32), such operation may impose a performance penalty in terms of latency and/or throughput of data storage operations. Therefore, in some arrangements, KCM 54 is able to arrange for the encryption to be performed by hardware-level encrypting circuitry which may be located within one or more HBAs 36 as mentioned above. In many case, such encrypting circuitry will include a combination of hardware and firmware. An HBA 36 that includes such encrypting circuitry may be referred to as an encrypting HBA or "EHBA", while an HBA 36 that does not include such encrypting circuitry may be referred to as a non-encrypting HBA or "NHBA". The term "hardware-assisted encryption" is used to refer to encryption being performed using such encrypting circuitry.

The various drivers and modules shown in FIG. 3 are also referred to using the term "functional components" elsewhere in this description.

Figure 4:
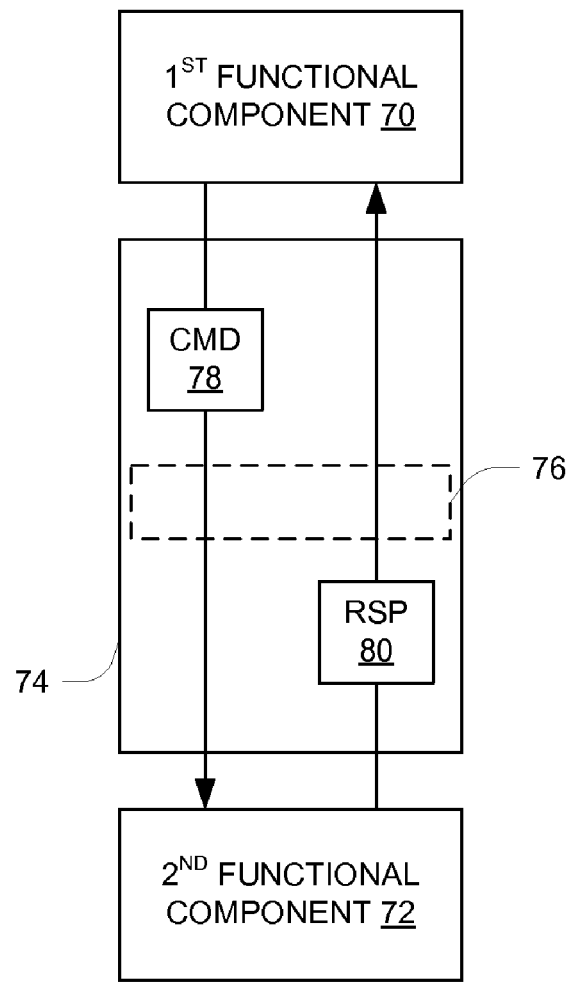
FIG. 4 depicts a transport mechanism used for protocol communications in a host computer.

FIG. 4 depicts a communications channel or "transport" mechanism by which the components of the I/O stack 46 engage in communications that pertain to the processing of storage I/O commands issued by the host 16 and directed to a storage device 20. In one embodiment, this aspect of processing may be encryption-related processing, and the communications may be protocol communications such as a "DEK management protocol", where DEK stands for "data encryption key". Details of a DEK management protocol and its role in operation of the host 16 are given below. Generally speaking, the transport mechanism may be used for any type of command-response protocol and is not limited to use with a DEK management protocol.

FIG. 4 shows two functional components 70, 72 that use a transport mechanism 74 for conducting the protocol communications. In the illustrated embodiment, the functional components 70, 72 generally correspond to any pair of the various constituents of the I/O stack 46 and/or HBA 36 of FIG. 3. For example, they may be taken as the multipathing module 62 and HBA driver 47 respectively. For ease of description, the transport mechanism is described using the simplified arrangement of FIG. 4 having only two functional components 70, 72 (which are also referred as "initiator" and "responder" below). However, as described in more detail below, the transport mechanism 74 may extend through multiple functional components or layers (e.g., of I/O stack 46), some or all of which may be "protocol-aware" and participate in the communications while others may be "non-protocol-aware" (or "non-participating") and simply act as relays. This potential for intermediate actors in the transport mechanism 74 is indicated in FIG. 4 by a dotted-line phantom box 76.

The communications protocol (e.g., DEK management protocol) is assumed to be a command-response protocol which involves the sending of a protocol command message (CMD) 78 by the first functional component 70 and the returning of a corresponding protocol response (RSP) 80 by the second functional component 72. The command message and response 78, 80 effect an exchange of protocol data that is used to control the processing of storage I/O commands by the second functional component 72 (and potentially by the first functional component 70 and/or other components represented by box 76). The processing may be encryption-related processing, for example. The protocol data also preferably includes certain identification data that identifies the protocol data as such, i.e., the identification data indicates that the data being conveyed by the transport mechanism 74 constitutes a protocol message 78 or 80 as opposed to some other data that should not be interpreted as a protocol message.

The transport mechanism 74 is an "in-band" mechanism that employs storage read commands and corresponding read responses of the general type used for normal storage read operations. For example, in the case that the storage I/O interface between the host 16 and a storage device 20 employs Small Computer Systems Interconnect (SCSI) protocol, the in-band transport mechanism can use a SCSI Read command and its associated response as the command 78 and response 80 respectively. The various layers of the I/O stack 46 will be designed to identify and process storage I/O commands as normally used by the host 16 to store and retrieve data to/from a storage device 20. The transport mechanism 74 utilizes this built-in capability to provide a way to carry the protocol communications among the layers to enable them to coordinate their processing of storage I/O commands in a desired way, for example as part of a data encryption scheme, etc. As explained below, it is particularly desirable that the DEK management protocol be carried in-band rather than via an out-of-band mechanism. Among other things, an in-band transport mechanism provides for generality and compatibility so as to be useful in a variety of hardware and/or software operating environments. It also provides for involvement of the intermediate layers 76 in the communications to conditionally modify commands and responses as may be needed to support multipathing, virtualization or other complex operations. Additionally, an in-band transport allows protocol commands to be directed to particular storage device in the same way as a normal storage read or write is directed to that storage device, and thus it supports protocols such as the DEK Management protocol that require processing specific to a storage device.

Generally, the transport mechanism 74 employs a "transport" read command which is a storage read command having unusual parameters or being otherwise different from "normal" storage read commands that are used by the host 16 to obtain storage data from the storage devices 20. In particular, the transport storage read command can utilize certain unusual predetermined read address information that plays a distinguishing role. In one embodiment, the read command uses a combination of an unusual starting block address and an unusual length. For example, the combination (1009, 3) might be used. This combination represents a small and odd-length extent of storage space located at a prime-numbered address, which is unlikely to be the target of a normal read command. A functional component (e.g., 72) can examine the starting block address and length of read commands, and upon finding the predetermined read address information it can identify the read command as a protocol transport message rather than a normal storage read command. In other embodiments, other types of predetermined address information can be used, including different combinations of starting block address and/or length.

Figure 5:
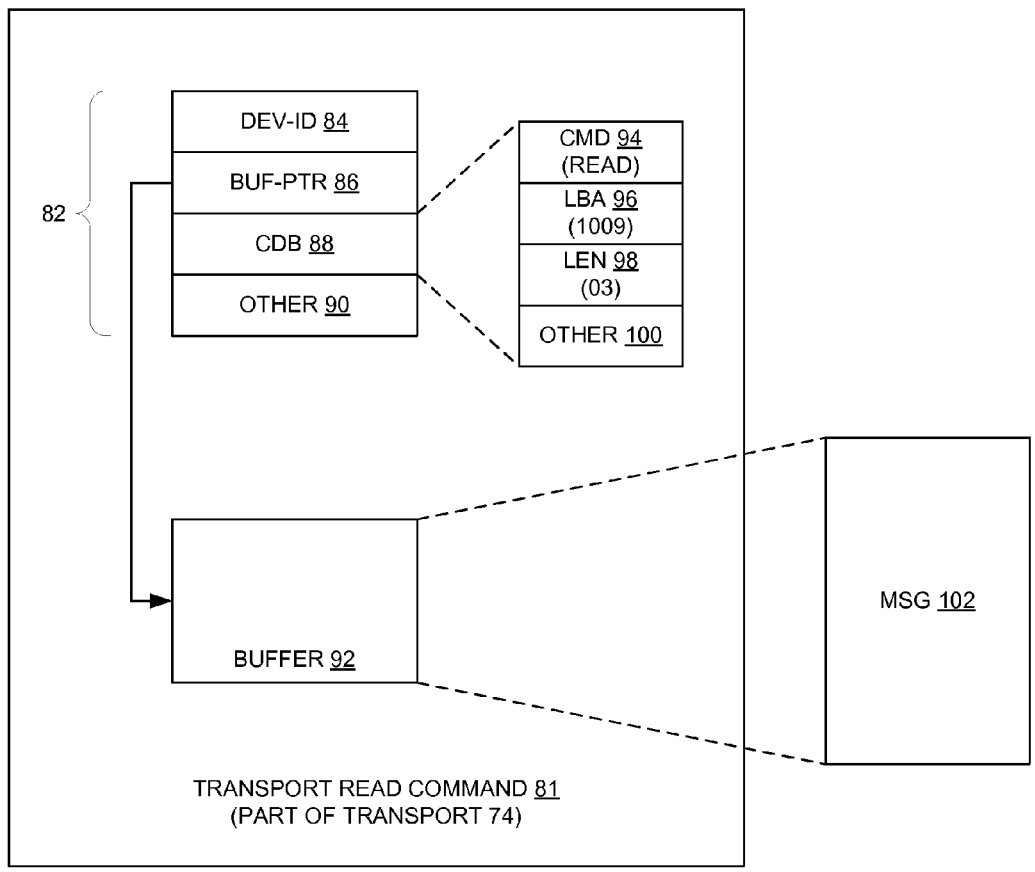
FIG. 5 is a more detailed depiction of a transport read command of the transport mechanism.

FIG. 5 illustrates the structure of a transport read command 81 which, as discussed above, is a storage read command used as part of the transport mechanism 74. A read command data structure 82 is shown as including a device identifier (Dev-ID) 84, a read buffer pointer (Buf-Ptr) 86, a command data block (CDB) 88, and other data (Other) 90. The read buffer pointer 86 identifies the location in memory 34 of a read data buffer 92. The CDB 88 is shown as including a command (CMD) 94, a starting logical block address (LBA) 96, a length (LEN) 98 and other data (OTHER) 100. A transport read command 81 will include a read command as the command 94 (as opposed to a write command or other commands that may be defined in the storage I/O interface and used for other, non-transport operations), and will also include the predetermined address information as the LBA 96 and length 98 (e.g., 1009 and 03 respectively). The read data buffer 92 includes the protocol message (MSG) 102 that is being transported (e.g., command message 78 or response 80 of FIG. 4).

Like other storage read commands, a transport read command 81 employs a memory-based mechanism within the host 16 for communicating I/O requests among different functional entities. For example, in a Windows® environment, so-called "I/O Request Packets" may be used. Other mechanisms such as queues or rings may be used in other computer architectures. The transport read command 81 employs both a read command data structure 82 and an associated read buffer 92, with the read command data structure 82 including the predetermined address information that identifies the read command as a transport read command 81. The read command data structure 82 is created in the memory 34, and a section of the memory 34 is allocated as the read data buffer 92. The protocol message 78, 80 is carried in the read data buffer 92. It will be appreciated that this represents an unusual use of a read data buffer. Read data buffer. Read buffers are not normally used to pass information from an initiator of a read command to another entity, and in fact the contents of a read data buffer are normally undefined until the data that is the subject of the read request is returned to the initiator via the read buffer. However, as part of the transport mechanism 74, the read data buffer 92 will contain a command message 78 when initially created, and will be read by a responder (second functional component 72).

As described below, additional identification data may also be used to provide increased confidence that the read command (or response) is a valid transport message as opposed to a normal read command (or response) that happens to be directed to the storage extent defined by the predetermined address information.

As mentioned above, the various items in FIG. 5 that make up a transport read command 81 are stored and operated upon in the memory 34 by both the initiator and responder (e.g., functional components 70 and 72), and are passed between functional components using an I/O request signaling mechanism in the host computer 16 such as generally known in the art. In one example, the Other data 90 of the read command data structure 82 includes a status field by which the completion of a read operation is signaled. For example, the responder (e.g., functional component 72) may change the status field to a value signifying completion, and the initiator (e.g., functional component 70) recognizes the completion of the read by this change to the value of the status field. Using this kind of technique, a single read data buffer 92 may be used for both a command message 78 and its associated response 80. The read data buffer 92 is initially filled with the command message 78 by the initiator, and the responder obtains the command message 78 by accessing the read data buffer (using the buffer pointer 86 in the read command data structure 82). When the response 80 is to be sent, the responder stores the response data in the read data buffer 92 and signals completion of the read (such as by modifying a status field in the Other data 90). The initiator then obtains the response 80 from the read data buffer 92.

It is to be understood that the transport mechanism 74 of FIG. 4 may use a set of multiple transport read commands 81 and their associated responses at different levels of a multiple-level I/O interface stack such as the I/O stack 46. For example, distinct transport read commands 81 and their responses may be used between the KCM 54 and virtualization module 60, between the virtualization module 60 and the multipathing module 62, and between the multipathing module 62 and the HBA driver 47. This chain-like functioning enables a layer to take layer-specific action on a protocol command and/or response. Examples are discussed below, including the duplicating of protocol commands to multiple functional components at an underlying layer and obtaining appropriate responses from each before returning a success response to the next higher layer. In this description, the term "like-organized" is used to signify a protocol transport message or protocol command having essentially the same organization or structure of another message or command. In the case of the chain-like functioning just described, it is contemplated that all of the protocol transport messages and protocol commands are like-organized.

Figure 6:
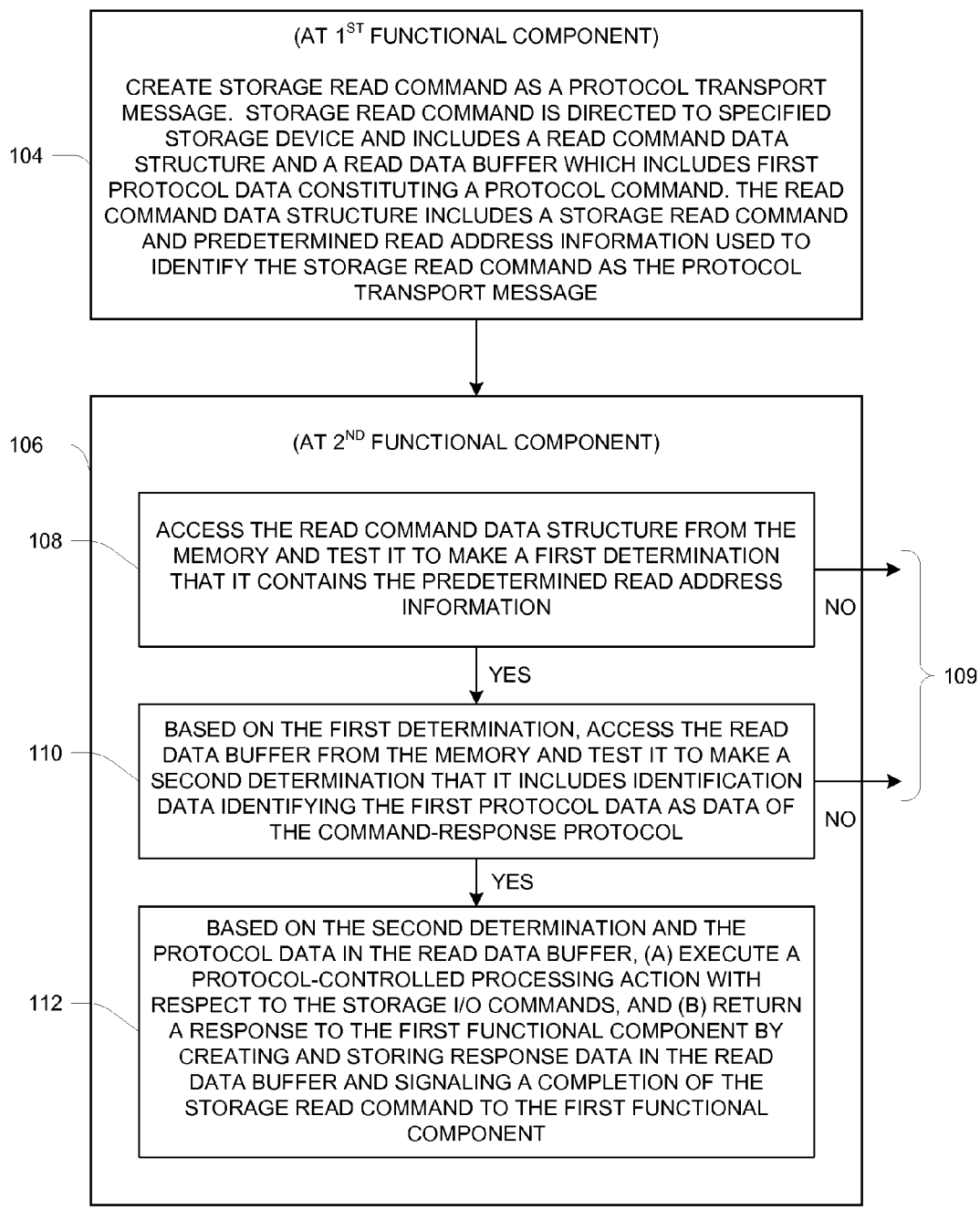
FIG. 6 is a flow diagram depicting transport-related operation.

FIG. 6 is a flow diagram illustrating operation at the transport mechanism 74 at a high level, with reference to the components shown in FIGS. 4 and 5 and discussed above.

At 104, the first functional component 70 creates a storage read command as a protocol transport message in the memory 34 of the host computer 16. The storage read command is directed to a specified storage device 20 and includes a read command data structure 82 and an associated read data buffer 92. The read data buffer 92 includes first protocol data constituting a protocol command (e.g., command message 78), while the read command data structure 82 includes a storage read command 94 and the predetermined read address information (LBA 96 and length 98) which is used to identify the storage read command 82 as a protocol transport message.

At 106, various steps are performed at the second functional component 72. At 108, the second functional component 72 accesses the read command data structure 82 from the memory 34 and tests it to make a first determination that it contains the predetermined read address information. If it does, then operation proceeds to step 110. Otherwise, processing terminates as indicated at 109 (at this point the read command may be processed separately as a normal I/O read command).

At 110, based on the first determination of step 108, the read data buffer 92 is accessed from the memory 34 and it is tested to make a second determination that it includes certain identification data identifying the first protocol data as data of the command-response protocol. If it does, then processing proceeds to step 112. Otherwise, processing terminates as indicated at 109 (at this point the read command may be processed separately as a normal I/O command). In one embodiment, the identification data is referred to as a "protocol signature", and is described below.

At 112, based on the second determination at 110 and the protocol data obtained from the read data buffer 92, the contents of the read data buffer 92 are interpreted as a protocol command 78 and the following actions are taken: (a) a protocol-controlled processing action specified by the protocol command is executed with respect to subsequent storage I/O commands which are initiated by the host 16 and directed to the specified storage device 20 via the storage I/O interface stack 46, and (b) a response is returned to the first functional component 70 by creating and storing response data in the read data buffer 92 and signaling a completion of the storage read command to the first functional component 70. This signaling may be effected by writing a completion status as described above or some other signaling mechanism Examples of protocol-controlled processing actions are described below.

As indicated above, a transport read command 81 of the transport mechanism 74 is similar to a normal I/O read request and response but with certain important differences. One difference is the use of the special predetermined address information which identifies the storage read command as a protocol transport message. A layer or component processing a read command can examine the address information and determine (to a high confidence) that the read command is a protocol transport message rather than a normal storage read command. Secondly, the actual protocol message (command message 78 or response 80) is carried in the read data buffer 92 of the read command. Thus, in contrast to normal storage reads, the read data buffer 92 of a transport read contains defined and meaningful data at the time the read command is created, not just at the completion of the read operation.

It will be appreciated that it is generally not possible to guarantee that normal (non-transport) storage read commands will never utilize whatever predetermined address information is chosen to identify the transport read commands 81. If a normal read were to use the predetermined address information, then a functional component processing such a read command (such as second functional component 72, for example) might erroneously attempt to interpret the undefined contents of the associated read buffer as a protocol message to be processed in accordance with the protocol, leading in general to indeterminate and perhaps even destructive operation. This problem is addressed by use of the identification data in the message 102 as discussed above. Before processing the contents of a read buffer 92 as a protocol message, a functional component makes an additional determination that the data in the read buffer 92 includes the identification data which identifies the data as a protocol message (see step 110 of FIG. 6). This additional test makes a false positive much less likely, as it would be required that both a normal read using the unusual address information has occurred and that the undefined data initially in the read buffer includes the protocol identification data.

For additional confidence, the command-response protocol may employ multiple messages in an initial phase of communication which must all succeed in order for the protocol-controlled processing to commence. Examples below include the combination of a handshake command and a query command. This can further reduce the chance that a set of normal read requests will be erroneously interpreted as the required sequence of initial protocol commands.

Figure 7:
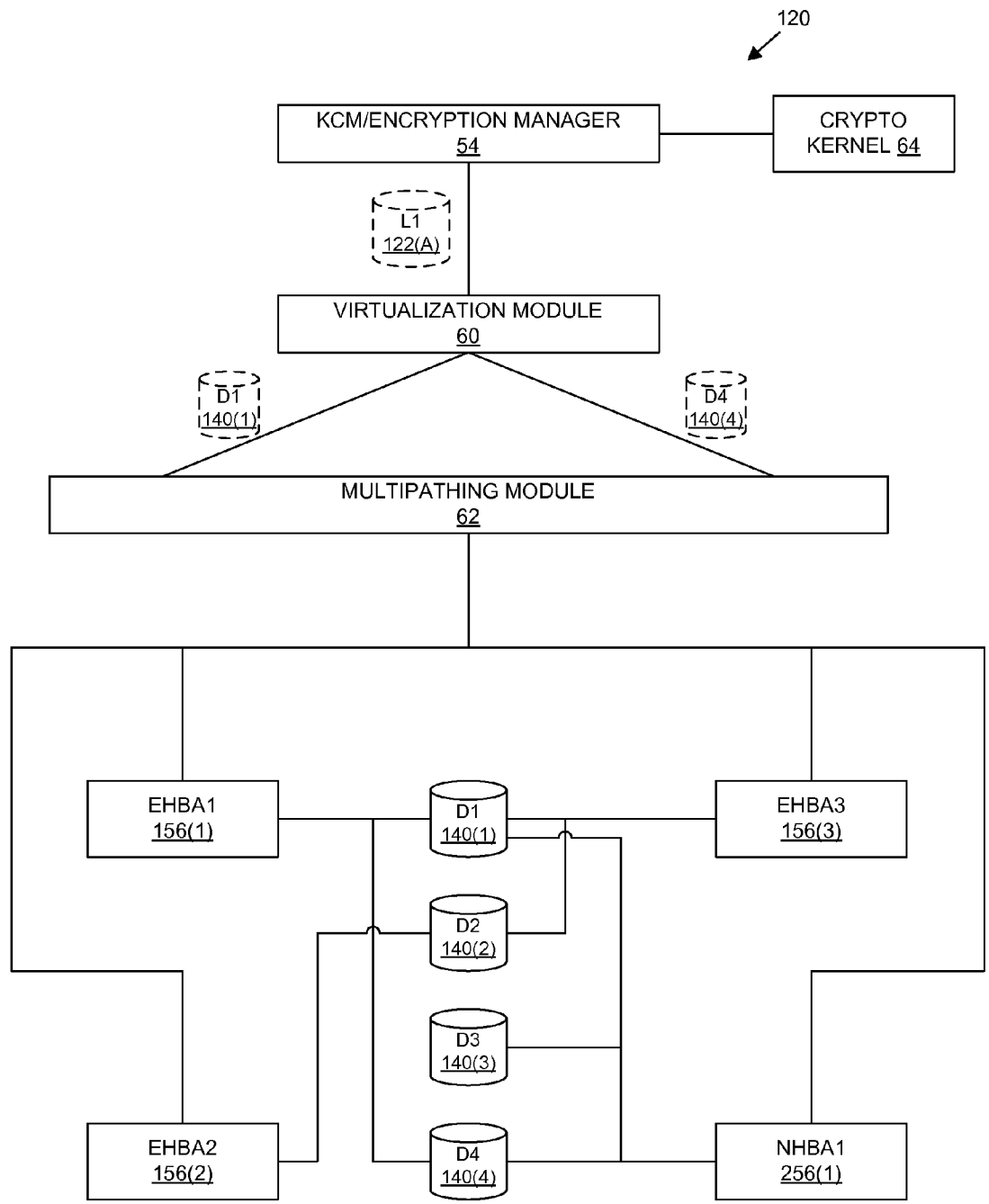
FIG. 7 depicts an example logical layout of a system for use in practicing various embodiments of the invention.

FIG. 7 depicts an example logical arrangement 120 of storage I/O stack 46 and other system elements according to one embodiment. In particular, FIG. 7 depicts functional connections within the storage I/O stack 46 and between the storage I/O stack 46 and certain disks of the storage devices 20 via respective HBAs 36. The disks 140(1)-140(4) are labeled D1-D4 respectively. The HBAs 36 are shown as EHBAs 156(1)-156(3) and an NHBA 256(1), where the terms EHBA and NHBA stand for "encrypting HBA" and "non-encrypting HBA" respectively.

A logical volume L1 122(a) is defined by virtualization module 60. Virtualization module 60 provides a "virtualization" system function, presenting a logical unit of data (LU) as a logical disk or logical volume (LV) to KCM 54 and to the OS 40 via OS interface 48 even though the LV may not actually be a contiguous physical entity, which is assumed to result in assigning logical blocks of L1 to specific storage devices 20. This virtualization may be, for example, a mirroring, a striping, or some combination thereof. In arrangement 120, logical volume L1 122(a) is shown as being virtualized across two storage devices D1 140(1) and D4 140(4). It should be understood that, throughout this description, the term LU is used to refer to a logical unit of data at any level of abstraction (e.g., as seen by the KCM 54, as seen by one of the ILs 56, or as seen by an HBA 36), while the term LV is used to specifically refer to an LU as seen by the KCM 54. In general, the virtualization module 60 maps one or more storage "extents" defined at an upper layer of the I/O stack 46 to corresponding storage extents defined at a lower layer of the I/O stack 46, and in operation it generally maps upper-layer data location information of an upper-layer I/O command to corresponding lower-layer data location information. The term "extent" refers to a (generally contiguous) set of addressable blocks of storage data. The mapping may be from one address location to another on a given device, for example, or even from one device to another (in the case of striping, for example). "Data location information" includes items such as a logical block address and length appearing in a storage command.

A multipathing module 62 provides a multipathing system function by which multiple paths to these storage devices are established through the storage interconnect 18 and utilized in operation for greater parallelism, availability, and performance. As depicted, multipathing module 62 connects to EHBA1 156(1), EHBA2 156(2), EHBA3 156(3), and NHBA1 256(1) (via the HBA driver interface 50 and HBA driver 47 of FIG. 3), and the following paths exist:

To D1 140(1) via EHBA1 156(1), EHBA3 156(3), and NHBA1 256(1)
To D2 140(2) via EHBA2 156(2) and EHBA3 156(3)
To D3 140(3) via NHBA1 256(1)
To D4 140(4) via EHBA1 156(1) and NHBA1 256(1).

It should be noted that FIG. 7 presents a simplified example which assumes that each HBA 156, 256 and storage device 140 has only one connection to the storage interconnect 18. In general, as depicted in FIG. 1, each HBA 36 and storage device 40 may have multiple such connections, and it will be appreciated that the number of potential paths between a given HBA 156, 256 and storage device 140 may be correspondingly greater.

In the configuration of FIG. 7, the only path to disk D3 140(3) is via NHBA1 256(1), which means that there is no hardware-assisted encryption available for encrypting/decrypting data of that disk. The significance of this incapability is described below.

In an arrangement such as that of FIG. 7, the multipathing module 62 is responsible for maintaining an awareness of which disks 140 it can "reach" (engage in I/O operations with) as well as the corresponding set of usable paths to each reachable disk. The virtualization module 60 maintains an awareness of the disks (e.g., D1 140(1) and D4 140(4)) which underlie each logical volume (e.g., L1 122($a$)). Upon receiving storage commands (I/O commands including reads and writes of storage data) directed to logical volume L1 122($a$), the virtualization module 60 generates corresponding storage commands to D1 and D4 and issues these commands to the multipathing module 62. The multipathing module 62 responds by selecting a path for each command and issuing the command to the HBA 36 for the selected path. Storage commands directed to an encrypted region of a disk 140 may utilize the hardware-assisted encryption provided by an EHBA 156 along a selected path. In the event that a disk 140 is not reachable via an EHBA 156 (such as disk D3 140(3) as mentioned above), any such storage commands will utilize the encryption functionality of the crypto kernel 64.

Figure 8A:
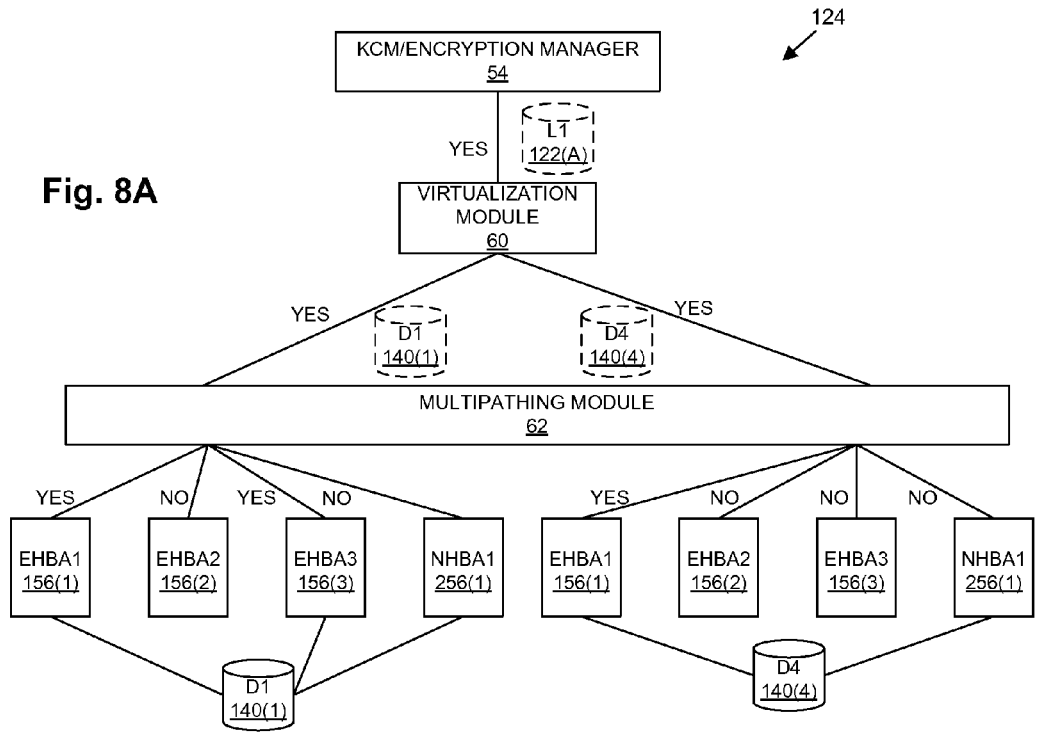
FIG. 8A depicts an example scenario according to one embodiment of the invention.
Figure 8B:
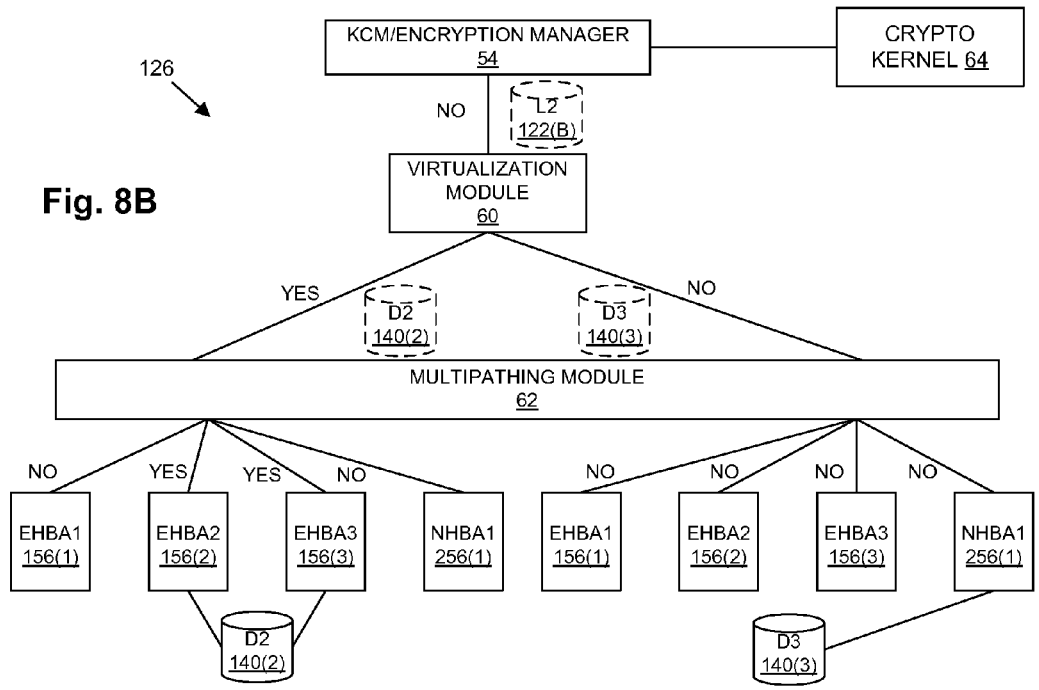
FIG. 8B depicts an example scenario according to another embodiment of the invention.

FIGS. 8A and 8B illustrate specific examples of the above-described operation in greater detail. In these figures, the labels "yes" and "no" are used to indicate whether a given HBA 156, 256 between the multipathing module 62 and a disk D1-D4 provides a path with hardware-assisted encryption to the disk. Thus, the label "no" appears for each NHBA 256 (because it is non-encrypting) and for each EHBA 156 that has no connection to a given disk D1-D4.

FIG. 8A depicts one arrangement 124 for disks D1 and D4 of logical volume L1. showing that logical volume L1 122($a$) may be encrypted using hardware-assisted encryption, because each underlying storage device D1, D4 for L1 can be accessed through an EHBA 156. In particular, storage device D1 may be accessed with hardware-assisted encryption via EHBA1 156(1) and EHBA3 156(3) (as indicated by the "Yes" along the connections between multipathing module 62 and the EHBAs 156(1) and 156(3) at the left side of FIG. 8A). Storage device D4 may be similarly accessed through EHBA1 156(1) (as indicated by the "Yes" "Yes" along the connection between multipathing module 62 and EHBA1 156(1) at the right side of FIG. 8A). Thus, a combination of EHBA1 156(1) and EHBA3 156(3) may be used to perform all encryption operations for accessing logical volume L1 122($a$).

FIG. 8B depicts an alternative arrangement 126 for a second logical volume L2 122($b$) and its underlying disks D2 140(2) and D3 140(3). As shown, disk D3 is accessible only via NHBA1 256(1). Therefore, encrypted storage operations for logical volume L2 122($b$) cannot utilize hardware-assisted encryption, because not all of its underlying storage devices (D3 in particular) can be accessed via an EHBA 156. Thus, in arrangement 126, crypto kernel 84 is used to perform the encryption operations required by any data storage operations to be performed on logical volume L2 122($b$).

The above description in connection with FIGS. 7 and 8A-8B illustrates certain important aspects of using hardware-assisted encryption in a system such as that of FIG. 1. First, it must be possible for an EHBA 156 to obtain the encryption metadata (including encryption key) for those regions of encrypted storage for which that EHBA 156 will handle data storage commands, so that the encryption circuitry of the EHBA 156 can perform the correct encryption/decryption operation using the correct key for each distinct region of storage. As the KCM 54 is the overall manager of encryption operations for the host 16 in which an EHBA 156 resides, a mechanism is needed to enable the KCM 54 to communicate the encryption metadata to its EHBAs 156. Additionally, a mechanism is needed for the KCM 54 to ascertain whether hardware-assisted encryption is available for any given region of storage. Both these needs are further complicated by the presence of ILs 56, especially those (like virtualization module 60) which are "remapping" layers that effect a translation or mapping between two different representations of a given storage volume. Additionally, even non-remapping layers like the multipathing module 62 create potential problems, because hardware-assisted encryption may not be available on all paths for a given disk 140, yet the system must ensure that encryption is performed reliably. All these issues point to the need for a communications protocol among the different layers of the storage I/O stack 46 to support the data encryption function.

Figure 9:
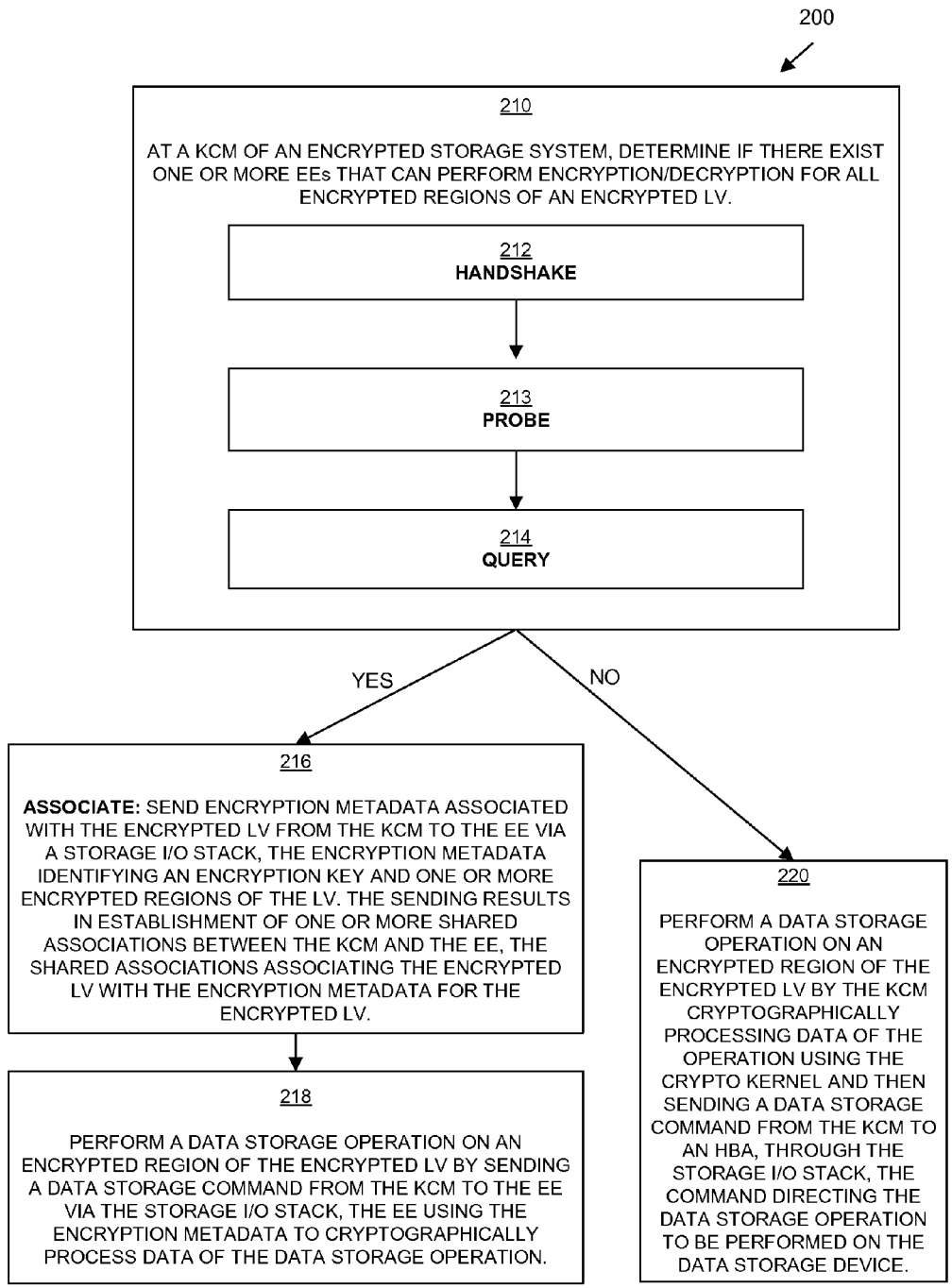
FIG. 9 depicts an example method according to one embodiment of the invention.

FIG. 9 depicts an example method 200 for setting up encryption on a logical disk (e.g., logical volume L1 122($a$)) and then performing encrypted storage operations in an efficient manner. FIG. 9 is directed to the specific case of hardware-assisted encryption, but several aspects of the method are more generally applicable to the use of other types of EEs, which perform cryptographic processing (e.g., encryption, decryption, or both), as explained below. In one embodiment the method is performed using an "in-band" communications protocol among the various components of the storage I/O stack 46. Here "in-band" refers to the fact that communication related to the method is performed along the same path as the I/O. In one embodiment, specialized SCSI commands and responses, for example, are transported up and down the storage I/O stack 46 using the transport mechanism 74 described above, which itself uses the same in-host signaling mechanism that is used to convey the normal SCSI storage commands (reads and writes) and responses. As previously indicated, the communications protocol may be referred to below as a "DEK management protocol," where the acronym DEK stands for "data encryption key."

By "up and down" the storage I/O stack 46 it is meant that a DEK management protocol command may be created by KCM 54 then passed to a top-level IL 56, such as virtualization module 60. That IL 56 examines the command and, in most cases (exceptional cases are discussed below), will send one or more corresponding commands to the next IL 56 down the stack, such as multipathing module 62. This pattern repeats until one or more commands reach HBA driver(s) 47. Responses flow in the other direction, from the HBA drivers 47 upward to the KCM 54. In some cases, commands may not travel completely down the storage I/O stack 46, and responses may be generated and sent upwards by one or more ILs 56. By this chain-like communications mechanism, information required for proper encryption-related operation is shared among the various components of the storage I/O stack 46. In all cases, the initiator of a command is an example of a first functional component 70 of FIG. 4, while a responder is an example of a second functional component 72. It will be appreciated that intermediate layers 56 may act as a responder for commands received from higher in the I/O stack 46, and also act as an initiator for commands being sent further down the I/O stack 46.

As described above with reference to FIG. 6, the transport mechanism 74 carries protocol communications messages (e.g., messages 78, 80) to cause a functional component to execute a protocol-controlled processing action with respect to storage I/O commands. In the case of the DEK management protocol, the protocol-controlled processing action is the encrypting and decrypting of the data that is the subject of the storage I/O commands. Details of DEK management protocol messages and the use of the DEK management protocol for controlling encryption/decryption operation are now described.

In one embodiment, KCM 54 uses the DEK management protocol to first determine whether or not there is an EHBA 156 (or a set of multiple EHBAs 156) that can provide encryption for each encrypted region of the logical volume L1 122 (a). If not, then it is deemed that EHBA encryption is not available, and the KCM 54 assumes responsibility for encryption/decryption operations for the logical volume L1 using the crypto kernel 64. If the KCM 54 determines that such EHBA encryption is available, it uses the DEK management protocol to provide the required encryption metadata to each EHBA 156 that requires it. Subsequently, storage commands directed to the logical volume L1 are sent down the stack 46 for execution, relying on operation of one or more EHBAs 156 for the data encryption/decryption part of operation for the encrypted regions.

As previously noted, encryption may be applied to separate "regions" of a given volume 122 or disk 140. Here "region" refers to a span of contiguous logical block addresses (LBAs). To illustrate the concept, assume a hypothetical simple volume 122 having 16 blocks of storage with addresses 0 through 15. The volume may have an encryption pattern as follows:

| LBA range | Encryption? |
| --- | --- |
| 0-3 | Not encrypted |
| 4-12 | Encrypted |
| 13-15 | Not encrypted |

The overall pattern for a given logical unit of data (LU) is referred to below as a "LUN map" (the term "LUN" is commonly used in the industry to refer to an LU). In operation, it is necessary for the KCM 54 to provide the LUN map for each volume to any EHBA 156 that will handle I/O for that volume. It is assumed herein that only one data encryption key is used for each volume, although in general it is possible to use different keys for different regions, for example.

In a somewhat more realistic example, an encrypted LU may store metadata and formatting information in plaintext form. In addition, certain additional regions of an encrypted LU may be designated as unencrypted for various reasons (e.g., to enhance performance on a region that is frequently accessed). For example, logical volume L1 122(a) may be an encrypted LU having a size of 10 megabytes. Given a 512-byte block size, logical volume L1 122(a) has 20,480 blocks. Blocks 0-1023 may be unencrypted and reserved for operating system use, while blocks 1024-1535 may be unencrypted and reserved for storing encryption metadata. Blocks 1536-10,239 may be encrypted, blocks 10,240-11,263 may be unencrypted for performance reasons, and blocks 11,264-20,479 encrypted. Thus, only blocks 1536-10,239 and 11,264-20,479 of logical volume L1 122(a) are subject to encryption.

Additionally, the virtualization module 60 distributes the blocks of logical volume L1 122(a) out across D1 140(1) and D4 140(4). For example, blocks 0-10,239 may be stored on D1 140(1), while blocks 10,240-20,479 are stored on D4 140(4). This arrangement places portions of logical volume L1 122(a) subject to encryption on both D1 140(1) and D4 140(4). It should be noted that the mapping between L1 and D1/D2 may not (and in many cases will not) preserve LBAs. Thus blocks 0-10,239 of L1 may be mapped to blocks 32,000-42,239 of D1, for example.

Referring again to FIG. 9, in step 210, KCM 54 determines if there exist one or more EEs (e.g., EHBA(s) 156) that can perform encryption/decryption for all encrypted regions of an encrypted logical volume (LV). If step 210 returns an affirmative response, execution proceeds with step 216, while if step 210 returns a negative response, execution may proceed with step 220. At step 220, it is concluded that there is no EE to perform encryption/decryption for the subject volume/disk, which means that any required encryption/decryption operations are to be performed by the KCM 54 using the crypto kernel 64. As described above with reference to FIGS. 8A and 8B, in the present example the condition of step 210 is satisfied for logical volume L1 122(a). However, for logical volume L2 122(b), step 210 evaluates in the negative because there is no encrypted path to D3 140(3), and thus the method will execute step 220 with respect to logical volume L2 122 (b). It should be noted that in some embodiments, even if an EHBA 156 is present in all paths to a storage device 20, condition 210 could still fail if an essential path (or an essential group of paths) is blocked by an error in the EHBA 156 (e.g., the EHBA 156 has no remaining capacity or is temporarily offline).

As shown in FIG. 9, step 210 may be accomplished by performing some or all of sub-steps 212 and 214, which perform handshake and query operations. In connection with these sub-steps, different specific commands and responses of the DEK management protocol are used as described more fully below. Table 1 provides a general structure for a DEK management protocol command block used in performing these operations:

TABLE 1

General command block format

| Bytes | Field |
| --- | --- |
| 0-7 | (8 bytes) Protocol Signature |
| 8-15 | (8 bytes) Checksum |
| 16-19 | (4 bytes) Version |

TABLE 1-continued

General command block format

| Bytes | Field |
|---|---|
| 20-23 | (4 bytes) Reserved |
| 24-27 | (4 bytes) DEK Management protocol Opcode |
| 28-31 | (4 bytes) DEK Management protocol Response Status |
| 32-39 | (8 bytes) DEK Management protocol Endpoint ID |
| 40-47 | (8 bytes) Key Controller Handle |
| 48-1535 | Command Specific Parameters and Data |

The general command block format is a structure having a format as shown in Table 1. In some embodiments, all commands are a maximum of 1536 bytes (3×512-byte blocks) long, although this is by way of example only. The fields and arguments are described below. In the description below, the label [In] means the parameter is an "input" passed from the KCM 54 in/down to the EE (via one or more ILs 56), while [Out] means the parameter is an "output" returned by the EE out/up to the KCM 54 (via one or more ILs 56). "Initiator" means the KCM 54 or cooperating IL 56 that generates a protocol command. "Device Object" means a device managed by a driver in the storage I/O stack 46. It may be a volume, an LV, an LU, a path device, or a storage device.

The following is a description of the various fields in the general command block shown in Table 1 above:

Protocol Signature—8 bytes—[In] identifies the contents as a DEK Management protocol Command, to distinguish DEK management protocol communications from other communications using the same in-band transport. During the "Handshake" command of step 212 (described below), the signature is set to a predefined value (e.g., 0x0a, 0x0b, 0x0c, 0x0d, 0x0e, 0x0f, 0x10, 0x11) by the KCM 54. The signature is echoed back unchanged by the EE for all commands. The protocol signature is an example of the identifying data discussed above.

Checksum—8 bytes—[In] Used as a means of validating (checking integrity of) a DEK management protocol command block. Contains a 32 bit cyclic-redundancy-check checksum of bytes 16 to 1535, stored in a longword. Calculated by the KCM 54 before sending the command down. Validating a DEK management protocol command helps protect against erroneous operation that may be caused by data errors. More importantly, the checksum can serve as a third line of defense against accidental misinterpretation of a normal read command as a protocol command. In the very unlikely case of a normal read command that uses the designated address and size and, by some accident, the proper protocol signature as well, it is extremely unlikely that the checksum also computes properly. Thus the checksum protects the integrity of the protocol messages.

Version—4 bytes—[In] DEK Management protocol version identifier.

DEK management protocol Opcode—4 bytes—[In] DEK Management protocol operation to be performed. Opcodes includes values for Handshake, Probe, Query, Associate, Update, and Disassociate. If an EE had been doing encryption for a Device Object, it can release any resources associated with that object after a Disassociate command and can keep them released until it sees a new Associate command. Associations are described below.

DEK management protocol Response Status—4 bytes—[Out] Reports completion status for the protocol command. Set by the EE. Examined by the ILs 56 and potentially modified by them. Examined by the KCM 54. Valid values for this field can include Success as well as various values representing failure due to a number of possible errors.

DEK management protocol Endpoint ID—8 bytes—[In/Out] Unique identifier for the EE's use. Its content varies by Opcode: returned up to the KCM 54 on a Handshake and echoed (sent back down to) the EE in Query, Associate, Update, and Disassociate commands.

Key Controller Handle—8 bytes—[In] Contains a handle used by the Initiator to match a DEK management protocol response with its originating command. The EE and ILs 56 should echo/return this field unchanged.

Command Specific Parameters and data—Up to 1488 bytes of command-specific data. Examples are discussed below.

Referring again to FIG. 9, in step 212 (which may be omitted), KCM 54 sends a Handshake command down to the next IL 56 in order to test for the existence of a cooperating EE in the storage I/O stack 46.

The KCM 54 sends the Handshake command as the first DEK management protocol command to a Device Object. Only one handshake at a time should be outstanding to a given device object. The EE should not trigger an internal state change upon receipt of a Handshake, e.g., a Handshake command should not reset associations currently in effect for a Device Object.

Generally, KCM 54 will send one Handshake command per LV that it manages. As long as KCM 54 receives one affirmative Handshake response command block in response to the Handshake command, KCM 54 will proceed to step 214. Otherwise, KCM 54 will proceed with software encryption.

When a cooperating IL 56 receives a Handshake command from above in the storage I/O stack 46, it passes the command down to the next level down in the storage I/O stack 46. If the LU potentially involves multiple EEs of the storage I/O stack 46, then the IL will replicate the command block (potentially with modification as discussed below) and send a copy down the storage I/O stack 46 toward each such EE.

For example, if the IL 56 is a virtualization module 60 that virtualizes the LU across two storage devices 20(a) and 20(b), then virtualization module 60 sends two copies of the Handshake command block down the storage I/O stack 46, one referencing storage device 20(a) as the device object, and the other referencing storage device 20(b) as the device object. If the virtualization module 60 receives any affirmative Handshake response command blocks, the virtualization module 60 responds back to the KCM 54 with an affirmative response. This indicates to the KCM that there is at least one EE that may require encryption metadata. However, it should be understood that in some embodiments, some ILs 56 may be configured to respond negatively if any of the Handshake response command blocks from below are negative.

The DEK management protocol supports multiple "classes" of EEs. An EE of a cooperating class ignores Handshake commands that do not contain its class name and acknowledges a Handshake addressed to its EE class name by filling in the Endpoint ID field.

See Table 2, below, for an example layout of a Handshake command block with Handshake-specific definitions of bytes 48-1535.

TABLE 2

Handshake command block format

| Bytes | Field |
|---|---|
| 0-7 | Protocol Signature |
| 8-15 | Checksum |
| 16-19 | Version |
| 20-23 | Reserved |
| 24-27 | Handshake Opcode |
| 28-31 | DEK management protocol Response Status |
| 32-39 | DEK management protocol Endpoint ID |
| 40-47 | Key Controller Handle |
| 48-303 | (256 bytes) Encryption Endpoint Class Name |
| 304-511 | (208 Bytes) Reserved |
| 512-1023 | (512 Bytes) Pseudo-random bytes |
| 1024-1151 | (128 Bytes) Reserved |
| 1152-1407 | (256 Bytes) Pseudo-random bytes |
| 1408-1535 | (128 Bytes) Reserved |

The following is a description of various command-specific fields in the Handshake command block shown in Table 2 above:

DEK management protocol Endpoint ID—8 bytes—[Out] Returned by the EE and for its internal use: the KCM 54 echoes (and thus addresses) this Endpoint ID in subsequent Probe, Query, Associate, and Disassociate commands for the Device Object. (An IL 56 creating a protocol command would use this Endpoint ID to address the EE.)

Endpoint Class Name—256 bytes—[In] Each class of EE has a name, expressed, for example, as a null-terminated ASCII string. Example endpoint class names include: "EHBA" for an HBA 36 with encryption (i.e., an EHBA 156); "DDM" for a data de-duplication module, which is typically an external intermediate device; and "RRM" for a remote replication module, which is typically an external intermediate device.

Pseudo-random bytes [512-1023]—512 bytes—[In/Out] "Handshake" region #1 is filled with pseudo-random data by the KCM 54 and sent down to the EE. The EE signals its presence in the storage I/O stack 46 to the KCM 54 by, for example, reversing the order of all 512 bytes in this region. This field is passed through untouched by ILs 56, although if multiple Handshake response command blocks are received from below, the IL 56 will choose the field from the appropriate received Handshake response command block to indicate affirmative or not, as appropriate. This field may also be generated by an IL that creates a command.

Pseudo-random bytes [1152-1407]—256 bytes—[In/Out] "Handshake region #2 is similar to "handshake" region #1. The Encryption Endpoint reverses all 256 bytes in this region before returning a response to the command.

Reserved bytes [20-23, 304-511, 1024-1151, 1408-1535]—468 bytes—Undefined. Reserved for future use. Set to 0x00 by the KCM 54, ignored by the IL 56 and EE. These bytes are covered by the checksum. An IL 56 should not overwrite them. They are included in checksum to guard against false positive of a SCSI or other I/O command being interpreted as a DEK management protocol command.

The EE is expected to update the version field if the version supported by EE is different than requested by KCM 54. The ILs 56 are also expected to ensure version compatibility with the EE. If the EE supports a lower version than required by the IL 56, IL 56 should fail the Handshake request.

Referring again to FIG. 9, in step 213 the KCM 54 sends a Probe command down to the next IL 56 to probe for the existence of "non-protocol-aware" intermediate layer virtualization drivers in the device stack 46, where "non-protocol-aware" means that the driver either cannot (or for some reason just does not) recognize and act on the DEK management protocol messages in the transport read commands/responses. Based on receipt of the "Success" Response Status at the end of the Handshake stage, the KCM 54 is aware of the EE's presence, possibly with a non-protocol-aware intermediate driver that does not remap the LBA 1009 on the device object. However, the intermediate driver could be re-mapping other LBAs on the device object and may not be a participant in the DEK management protocol, and that could lead to potential data corruption. The KCM 54 tries to minimize this possibility by the use of a Probe command.

The KCM sends a read capacity command on the device object and then sends Probe requests at three odd LBAs (and of length 3) on the device. The LBAs might be selected as the smallest odd integral values near to ⅓*n, (⅔)*n & n−1. The Probe-specific data in the payload contains the LBA itself.

Once the Probe command is dispatched, a co-operating and remapping driver 56 is expected to appropriately change the LBA in the read buffer 92 as well. A non-cooperating non-remapping driver lets the request go through as a normal read request, and a non-cooperating remapping driver remaps the LBA in the CDB 88 but does not alter the LBA in the read buffer 92.

After the Handshake phase is complete, the EE is expected to examine all read requests whose length is 3 blocks regardless of LBA. If it finds the protocol signature and the Probe opcode in the read buffer 92, it compares the LBA in the CDB 88 with the LBA in the read buffer 92. Should there be a mismatch, the EE returns a "Non-cooperating Virtualization Layer" (NOCOOP_VIRT) status, and otherwise (i.e., a matching relationship) it returns Success. In either case, the Read CDB 88 is not sent over the storage interconnect 18.

Based on the opcode status, the KCM 54 becomes aware of a non-cooperating driver between KC and EE.

See Table 3, below, for an example layout of a Probe command block.

TABLE 3

Probe command block format

| Bytes | Field |
|---|---|
| 0-7 | Protocol Signature |
| 8-15 | Checksum |
| 16-19 | Version |
| 20-23 | Reserved |
| 24-27 | Probe Opcode |
| 28-31 | DEK management protocol Response Status |
| 32-39 | DEK management Endpoint ID |
| 40-47 | Key Controller Handle |
| 48-55 | (8 bytes) Logical Block Address |
| 56-511 | (456 Bytes) Reserved |
| 512-1023 | (512 Bytes) Pseudo-random bytes |
| 1024-1151 | (128 Bytes) Reserved |
| 1152-1407 | (256 Bytes) Pseudo-random bytes |
| 1408-1535 | (128 Bytes) Reserved |

The following is a description of the various fields in the Probe command block shown in Table 3 above:

Probe Opcode—4 bytes—Probe—0x07080a09 (Sent as "0x09", "0x0a", "0x08", "0x07" in the Little Endian byte order)

DEK Management protocol Response Status—4 bytes—possible returns for a Probe are Success and Non-cooperating Virtualization Layer.

DEK Management protocol Endpoint ID—8 bytes—[In] Returned by the Encryption Endpoint for the Handshake, echoed back by Key Controller, thus addressing the Endpoint ID.

Key Controller Handle—8 bytes—Not used. Preferably set to zero.

Logical Block Address—8 bytes—[In] Set by the KC to the same LBA as in the Read CDB. Compared with the LBA in the Read CDB by the EE. The EE returns Success status if the two are identical and Non Cooperating Virtualization Layer if they are different. Intervening layers that remap LBAs will adjust them in the CDB. Protocol-aware ILs need to set this field and the CDB LBA to the same value.

The probe operation as described uses a somewhat different transport than other protocol commands—its transport is permitted to an address other than 1009, and an endpoint recognizes the probe transport by its use of a length 3 read command and the presence of the protocol signature and probe operation code in the read buffer. In alternative embodiments, a probe could be implemented using a non-read-based transport.

Referring again to FIG. 9, in step 214, KCM 54 sends a Query command down to the next IL 56 to determine if an encryption capability such as hardware-assisted encryption is supported for a specified range on an LV. Each IL 56 between the KCM 54 and the EE responds to the Query based on the encryption capabilities of the underlying devices.

An IL 56 broadcasts the Query command to all the underlying devices and aggregates the results of individual queries into one response to the KCM 54 (or an IL 56 above it). The response from an IL 56 should not lead to data corruption. For example, an IL managing a virtual volume spanning two underlying LUs should support hardware-assisted encryption on the virtual volume only if the paths to both the LUs have hardware-assisted encryption available.

For example, if the IL 56 is a virtualization module 60 that virtualizes a logical volume across two storage devices 20(a) and 20(b), then virtualization module 60 sends two copies of the Query command block down the storage I/O stack 46, one referencing storage device 20(a) as the device object, and the other referencing storage device 20(b) as the device object. Generally, only if the virtualization module 60 receives affirmative Query response command blocks for both storage devices 20(a) and 20(b) will the virtualization module 60 respond back to the KCM 54 with an affirmative response, however, this behavior may differ if a particular form of virtualization is performed that allows otherwise. For example, in the case of a read-only LV mirrored onto two or more distinct LUs, as long as one of the LUs is readable with encryption at the level of an EHBA 156, the virtualization module 60 may return an affirmative response, even if a negative response is returned for one of the LUs.

As an alternate example, if the IL 56 is a multipathing module 62 having paths through multiple HBAs 36 to a given storage device 20, then the multipathing module 62 sends copies of the Query command block to all such HBAs down the storage I/O stack 46. If the multipathing module 62 receives any affirmative Query response command blocks, the virtualization module 60 respond back to the KCM 54 with an affirmative response.

An EE looks for the Endpoint ID in the payload that matches its ID (i.e., the Endpoint ID that is sent up by the EE to the KCM 54 in the Handshake response), and returns affirmatively if it can perform its encryption capabilities on the specified ranges for the device object. Otherwise the EE may return in the negative (e.g., if the EE does not have a connection to the appropriate storage device 20, if the EE was not initialized, or if the EE is temporarily busy and the command should be retried).

Included within the Query command is a LUN Map, which defines the areas subject to encryption. Each area is provided with reference to a Logical Block Address (LBA), which is an abstraction of the block addresses at a given layer of logical abstraction. Returning to the example provided above in which logical volume L1 122(a) is an encrypted LV 10 megabytes in size, blocks 1,536-10,239 and 11,264-20,479 of logical volume L1 122(a) would be listed as subject to encryption.

Some ILs 56 may remap the LUN map as appropriate. These ILs 56 are referred to as "remapping" ILs 56. For example, a virtualization module 60 is an example of a remapping IL 56, while a typical multipathing module 62 is not a remapping IL 56. Recall that, in the example, blocks 0-10,239 of logical volume L1 122(a) are stored on D1 140(1), while blocks 10,240-20,479 are stored on D4 140(4). Further suppose that the encrypted blocks stored on D1 140(1) begin at local block 1,000,000, while the encrypted blocks stored on D4 140(4), begin at local block 2,097,152, but actually are spread out across 2 ranges: 2,097,152-2,101,759 and 3,145,728-3,150,335. Therefore, in the Query command passed on to storage device D1 140(1), the LUN Map will indicate LBAs 1,000,000-1,008,703; and in the Query command passed on to storage device D4 140(4), the LUN Map will indicate LBAs 2,097,152-2,101,759 and 3,145,728-3,150,335.

See Table 4, below, for an example layout of a Query command block.

TABLE 4

Query command block format

| Bytes | Field |
|---|---|
| 0-7 | Protocol Signature |
| 8-15 | Checksum |
| 16-19 | Version |
| 20-23 | Reserved |
| 24-27 | Query Opcode |
| 28-31 | DEK management protocol Response Status |
| 32-39 | DEK management protocol Endpoint ID |
| 40-47 | Key Controller Handle, Undefined |
| 48-71 | (24 bytes) Undefined |
| 72-75 | (4 bytes) LUN Map Count |
| 76-83 | (8 bytes) Starting LBA Entry[0] |
| 84-91 | (8 bytes) Number of Blocks [0] |
| 92-99 | (8 bytes) Starting LBA Entry[1] |
| 100-107 | (8 bytes) Number of Blocks [1] |
| 108-1019 | LBA Range Structures [2] to [58] |
| 1020-1027 | (8 bytes) Starting LBA Entry[59] |
| 1028-1035 | (8 bytes) Number of Blocks [59] |
| 1036-1535 | Reserved |

The following is a description of the various fields in the Query command block shown in Table 4 above:

DEK management protocol Endpoint ID—8 bytes—[In] Returned by the EE in the Handshake command response, echoed back by KCM 54, thus addressing the Endpoint ID.

Undefined bytes [48-71]—24 bytes—[In/Out] Undefined, can be anything. Included in checksum.

LUN Map Count—4 bytes—[In] Number of valid LUN Map entries being queried. Must be at least one and not greater than the total entries that can fit in the read buffer, (e.g., 60.) The IL 56 validates the map.

LUN Map Entry—16 to 960 bytes (up to 60 16-byte structures)—[In] The LUN map is a list of LBA ranges on the LU. Each LUN Map entry contains 2 sub-entries, each of which is, for example, a 64-bit integer: a starting LBA; and a number of blocks. Any remapping IL 56 can adjust the starting LBA and/or number of blocks as the request for association flows down the stack.

Reserved bytes [1036-1535]—Undefined and reserved for future use.

Recall that, if step 210 returns an affirmative response, execution proceeds with step 216, while if step 210 returns a negative response, execution may proceed with step 220. In some embodiments, step 216 may also be executed on its own, without first performing step 210.

In step 216, KCM 54 sends encryption metadata associated with the encrypted LV from the KCM 54 to the EE via ILs 56, the encryption metadata identifying an encryption key and one or more encrypted regions of the LV. The encryption metadata may also identify other associated encryption information needed to perform the encryption algorithm, such as, for example, an identification of the encryption algorithm. The sending results in establishment of one or more shared associations between the KCM 54 and the EE, the shared associations associating the encrypted LV with the encryption metadata for the encrypted LV. In one embodiment, this step is accomplished using the DEK management protocol by sending a DEK Management Associate command.

The Associate command creates an association of (1) an Encryption Key Blob, with (2) a LUN Map on (3) a Device Object, thereby effectively turning on encryption for the LU and LBA Range(s). The Key Blob is a set of encryption metadata, storing the key and all the other information needed to perform encryption/decryption that is stored on the key manager, as described below. Although in the on-host case, the key blob is sent within the Associate command, in an off-host case, the key ID may be sent within the Associate command instead of the key blob (or, in some embodiments, an encrypted version of the key blob, referred to as a "wrapped" key blob, may be sent). Multiple Key Blob/LUN Map Associations can be made for a Device Object. Associate commands can be generated by the KCM 54 and by ILs 56, although ILs 56 do not originate an association, but rather pass on one or more copies (with modifications as necessary) of an Associate command received from above. In some cases, the association may also include Application information.

There are two forms of an Associate command:
New Association—creates a new association. In the case of a new association, the Associate command block arrives at the EE or IL 56 with a Null "Association Handle" (see below). This tells the EE/IL 56 that this association does not currently exist, that it should be created and that an Association Handle reference should be created and returned in the Associate response.

Refresh Association—the Refresh Association originates from the KCM 54 and exists for the benefit of the ILs 56 or the EE. In the case of a Refresh Association, the Associate command block arrives at the EE or IL 56 carrying the Association Handle created by the EE (or an IL 56) as part of a preceding initial association.

An EE should respond as follows for the different Association types/association handle values:

If the Association Handle is NULL—it means the KCM 54 or an IL 56 is creating a new Association, so the EE should:
Validate the parameters as needed (see below).
Create the Association.
Return a Handle for the Association.
If the EE already has an association, provided there is no range overlap, it should ignore the existing association and treat the request as a new association.

If the Association Handle is not Null—it means the Association exists, so the EE should:
If the Associate carries the same LUN Map and Key Blob specified in the original Associate, then return Success status.
Else—something is wrong, this should not happen—so respond negatively by returning an Association Exists status.

Any Associate command (whether the first or a repeat) should be preceded by a Query command—though the EE does not need to enforce this.

Figure 10:
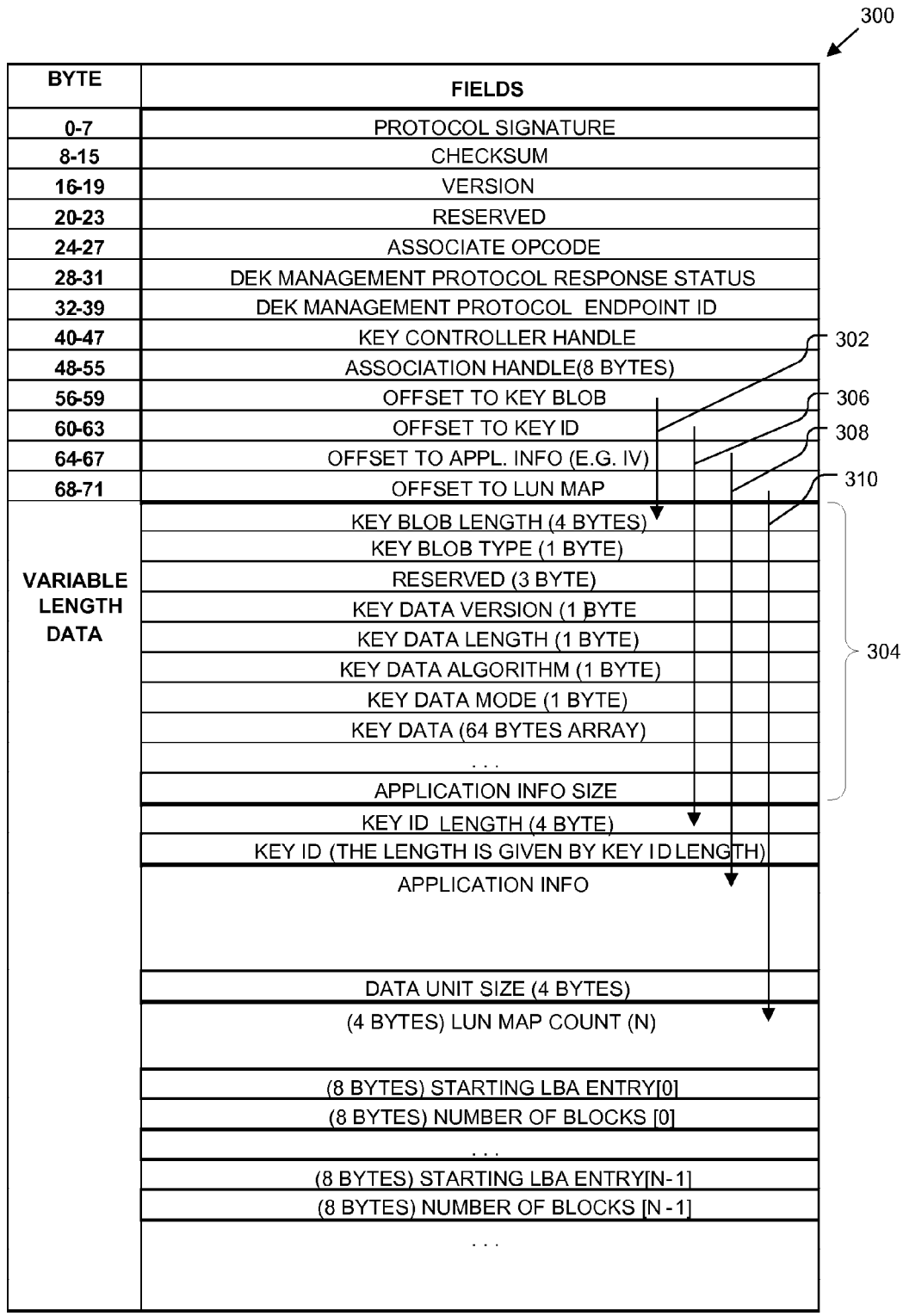
FIG. 10 depicts an example structure of one type of protocol command according to one embodiment of the invention.

FIG. 10 shows an example layout of an Associate command block. The following is a description of the various fields in the Associate command block shown in FIG. 10:

DEK management protocol Response Status—4 bytes—[Out] possible returns are Success, Invalid HW State, No Memory, Busy, Invalid Range, Invalid Key, Association Exists, Association Overflow.

DEK management protocol Endpoint ID—8 bytes—[In] Echoed from the EE's response to the initial Handshake command. Address of the EE for the Associate. The EE passes on an Associate command that does not contain the EE's Endpoint ID.

Association Handle—8 bytes—[In/Out]
[In] Zero—first time Association. An Association Handle is returned by the EE or IL 56. The handle is an internal value used by the EE or IL 56 for accessing an association. The Association Handle is subsequently passed back down by the KCM 54 to the EE in Update and Disassociate commands. An EE assigns a unique association handle for each association created. ILs 56 may need to replace the association handles based on their internal device mappings, so that a single handle is returned to the KCM 54. An IL 56 keeps track of the handle(s) returned from below it and uses those handles for passing down any subsequent Associate or Disassociate command.
[In] Non-zero implies KCM 54 is attempting to refresh an existing association. When dispatching it to the newly discovered devices, the ILs 56 should zero out the association handle and replace the handle with the new handle on the way up to KCM 54.

Data Encryption Key Parameters—
The association handle is followed by offsets to various data items 304:
Key Blob 304 (4 bytes) (offset shown as 302 in FIG. 10)
Key ID (4 bytes) (offset shown as 306 in FIG. 10)
Application Info (4 bytes) (offset shown as 308 in FIG. 10)
LUN Map (4 bytes) (offset shown as 310 in FIG. 10)
These offsets 302, 306, 308, 310 are followed by the following variable length parameters:
Key Blob 304
Key Blob Length—4 bytes[In]—The number of bytes in the key blob
Key Blob Type—1 byte [In]—This field indicates whether the format of the key blob is "wrapped" (i.e., encrypted, as, for example, it may be when being sent within a highly-secure system) or "unwrapped" (i.e., unencrypted, as, for example, it may be when being sent to an EHBA 156 within the host 16).
Key Data
Key Data Version—1 byte [In]—Versioning information for the key data
Key Data Length—1 byte [In]—Length of the symmetric key
Key Algorithm—1 byte [In]—Algorithm Key Mode—1 byte [In]—Algorithm Mode Key Data—64 bytes [In]—Carries the key data of the length "Key Data Length". Extra bytes, if any are, zero.

Application info size—1 byte—[In] maximum accepted size of the application information.

Key ID

Key ID Length—4 bytes [In]—Number of bytes in key ID

Key ID bytes—[In]—Key ID bytes

LUN Map Count—4 bytes [In]—Number of valid LUN Map entries being reported. It should be at least one. Implementations can restrict the number of LUN map entries supported.

LUN Map Array—16 to 960 bytes (up to 60 16-byte structures)—[In] Specifies the LBA ranges on the Device Object to associate with the Key Blob 304 or Key ID. Sub-fields include starting LBA and a length or LBA-count. Unused map entries are set to zero.

Reserved bytes [variable-1535]—Unused and undefined

Referring again to FIG. 9, upon successful completion of an Associate during step 216, an EE is ready to apply encryption/decryption to the encrypted regions of a LU as defined in the LUN map, using the encryption metadata from the Key Blob and the application information. As long as the association remains active, subsequent read/write commands directed to these regions employ decryption/encryption using the encryption metadata. This operation is depicted in step 218.

The DEK management protocol may also employ Update and Disassociate commands. An Update command tells the EE to update the association for the Device Object with the Key Object and LUN map information in the protocol command block. It provides an atomic way for an EE to effectively delete and create an association in one step. It would be used, for example, to support resizing of an encrypted LU.

The Disassociate Command deletes the association that had been created with a previous Associate command for a Device Object. Subsequent read and write commands in the LBA range(s) covered for that association are no longer encrypted/decrypted by the EE. Disassociate is used when the EE can no longer perform its duties and a switch to encrypting using the crypto kernel 64 is needed. Switching back happens through a new Associate command. An example, looking back at FIG. 4, would be if EHBA1 failed for some reason. D1 and D4 would still be reachable by EHBA3 and NHBA1, respectively, but the Crypto kernel 64 would have to be used so the Disassociate would be sent on L1. Both the Update (which, in some embodiments, is an Associate command containing a valid non-null handle) and Disassociate commands include an Association Handle to identify the subject association.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer connected to a storage device, comprising:

employing a command-response protocol between first and second functional components of a storage input/output (I/O) interface stack of the computer, the command-response protocol including exchange of protocol data used to control processing of storage I/O commands by the second functional component, the protocol data including identification data identifying the protocol data as data of the command-response protocol;

at the first functional component, creating a storage read command as a protocol transport message in a memory of the computer, the storage read command being directed to the storage device and including a read command data structure and a read data buffer specifically associated therewith, the read data buffer including first protocol data constituting a protocol command, the read command data structure including a storage read command and predetermined read address information used to identify the storage read command as the protocol transport message; and at the second functional component:
1) accessing the read command data structure from the memory and testing it to make a first determination that it contains the predetermined read address information;
2) based on the first determination, accessing the read data buffer from the memory and testing it to make a second determination that it includes the identification data; and
3) based on the second determination and the protocol data in the read data buffer, (a) executing a protocol-controlled processing action with respect to the storage I/O commands, and (b) returning a protocol response to the first functional component by creating and storing response data in the read data buffer and signaling a completion of the storage read command to the first functional component.

2. A method according to claim 1, wherein the storage device is a block-oriented storage device and the predetermined address information includes a starting logical block address identifying a location of a block of storage space of the block-oriented storage device.

3. A method according to claim 2, wherein starting logical block address is a prime-numbered address and the predetermined address information further includes an odd-numbered length value, and wherein the testing to make the first determination includes determining that both the prime-numbered address and the odd-numbered length value are present.

4. A method according to claim 1, wherein the identification data includes a protocol signature value identifying the first protocol data as the protocol command and distinguishing communications of the command-response protocol from other communications that use like-organized transport messages.

5. A method according to claim 1, wherein the second functional component is a lower-layer functional component operating at a lower layer of the storage I/O interface stack, and the first functional component is an intermediate-layer functional component operating at an intermediate layer of the storage I/O interface stack between the lower-layer functional component and an upper-layer functional component operating at an upper layer of the storage I/O interface stack, the intermediate-layer functional component being a protocol-aware layer operative to use the protocol transport message as a lower-layer transport message to communicate with the lower-layer functional component in response to a like-organized upper-layer transport message used by the upper-layer functional component to communicate with the intermediate-layer functional component.

6. A method according to claim 5, wherein:

the intermediate-layer functional component is a protocol-aware virtualization module operative to map one or more storage extents defined at the upper layer to corresponding lower-layer storage extents defined at the lower layer and to create the lower-layer transport message to include lower-layer data location information by mapping distinct upper-layer data location information of the upper-layer transport message.

7. A method according to claim 6, wherein:

the protocol command is a lower-layer probe command created by the virtualization module in response to receiving an upper-layer probe command used by the upper layer to probe for the possible presence of a non-protocol-aware virtualization module in the storage I/O stack, the lower-layer probe command including lower-layer probe data mapped from upper-layer probe data included in the upper-layer probe command, the upper-layer probe data having a matching relationship with upper-layer data location information in the upper-layer transport message carrying the upper-layer probe command;

the lower-layer functional component is operative in response to receipt of the lower-layer probe command to (1) determine that the lower-layer probe data has the matching relationship with the lower-layer data location information in the lower-layer transport message, and (2) in response to the determination, return a success response to the lower-layer probe command, the success response being forwarded to the upper-layer functional component, the success response being an alternative to a failure response that would have been returned if the lower-layer probe data did not have the matching relationship with the lower-layer data location information; and at the upper-layer functional component, to interpret the success response as evidence that the non-protocol-aware virtualization module is not present in the storage I/O stack.

8. A method according to claim 7 wherein the upper-layer data location information includes a predetermined length value used to partly identify the upper-layer transport message as carrying the upper-layer probe command, and further including, at the lower-layer functional component for each received storage read command having the predefined length value, checking for the presence of the identification data and a protocol operation code of probe command to be processed by the lower-layer functional component.

9. A method according to claim 6, wherein the lower-layer functional component is one of a set of lower-layer functional components among which the virtualization module is operative to distribute storage I/O commands, and correct processing of the storage I/O commands requires that each of the lower-layer functional components is capable of the protocol-controlled processing action, and wherein the virtualization module is operative to (a) utilize a plurality of like-organized lower-layer transport messages to communicate with respective ones of the set of lower-layer functional components, and (b) to provide an upper-layer protocol response to an upper-layer protocol command in the upper-layer transport message based on respective lower-layer responses from the lower-layer functional components.

10. A method according to claim 9, wherein communicating with the lower-layer functional components includes querying their respective capabilities for the protocol-controlled processing action, the querying done in response to receiving a query command from the upper-layer functional component, and wherein the upper-layer protocol response is a success response to the query command only if results of the querying show that all the lower-layer functional components are capable of the protocol-controlled processing action.

11. A method according to claim 9, wherein the storage device is one of a set of storage devices reachable via respective paths on which the lower-layer functional components respectively reside, and wherein the virtualization module is a mirroring component operative to send one or more duplicates of write-type storage I/O commands to the storage devices on the respective paths.

12. A method according to claim 5, wherein the intermediate-layer functional component is a multipathing component and the lower-layer functional component is one of a set of lower-layer functional components among which the multipathing component can distribute storage I/O commands, the lower-layer functional components residing on distinct paths to the storage device, and wherein correct processing of the storage I/O commands requires that at least one of the lower-layer functional components is capable of the protocol-controlled processing action and that the multipathing component direct storage I/O commands requiring the protocol-controlled processing action to only those lower-layer functional components capable of the protocol-controlled processing action, and wherein the multipathing component is operative in response to receiving a query command from the upper-layer functional component to (a) utilize a plurality of like-organized lower-layer transport messages to communicate with respective ones of the lower-layer functional components to obtain respective lower-layer responses pertaining to their respective capabilities for the protocol-controlled processing action, and (b) if at least one of the lower-layer responses contain a success response, then return a successful query response in an upper-layer transport message, and otherwise return a failure query response in the upper-layer transport message.

13. A method according to claim 5, wherein the lower-layer functional component is an encryption endpoint of the computer, and the protocol-controlled processing action includes encrypting and decrypting data as part of processing the storage I/O commands, the encrypting being performed on data written to the storage device, the decrypting being performed on data read from the storage device.

14. A method according to claim 13, wherein the upper-layer functional component is a key controller module of the computer, and wherein the command-response protocol is a data encryption key management protocol used by the key controller module to provide a data encryption key to the encryption endpoint for use in the encrypting and decrypting of the data of the storage device.

15. A method according to claim 1, wherein the second functional component is a lower-layer functional component operating at a lower layer of the storage I/O interface stack, and the first functional component is an upper-layer functional component operating at an upper layer of the storage I/O interface stack, and wherein the storage I/O interface stack further includes an intermediate-layer functional component operating at an intermediate layer of the storage I/O interface stack between the upper-layer functional component and the lower-layer functional component, the intermediate-layer functional component being a non-protocol-aware layer operative to (i) forward the protocol transport message to the lower-layer functional component without examining the read data buffer or itself responding to the upper-layer protocol command, (ii) forward a corresponding transport response from the lower-layer functional component to the upper-layer functional component without affecting contents of the read data buffer or modifying the transport response.

16. A method according to claim 1, wherein the command-response protocol includes two distinct protocol commands both used in an initial phase of communications between the first and second functional components and both requiring a corresponding success response as a condition to the performing of the protocol-controlled processing action by the second functional component.

17. A method according to claim 16, wherein the two distinct protocol commands include a handshake command and a query command, the handshake command used by the first functional component to identify the presence of the second functional component, and the query command used by the first functional component to obtain information from the second functional component regarding its capability for the protocol-controlled processing action.

18. A method according to claim 1, wherein the protocol data includes a checksum used to protect integrity of the protocol data, the checksum being generated by a predetermined check function applied to the protocol data as included in the protocol command by the first functional component, and wherein the second functional component is operative to apply the predetermined check function to the protocol data as received by the second functional component to calculate a check function result indicating that the protocol data represents a valid protocol command.

19. A data processing system, comprising:
a host computer; and
a storage device coupled to the host computer by functional components of a storage input/output (I/O) interface stack of the host computer;
wherein first and second functional components of the storage I/O interface stack employ a command-response protocol therebetween, the command-response protocol including exchange of protocol data used to control processing of storage I/O commands by the second functional component, the protocol data including identification data identifying the protocol data as data of the command-response protocol;
the first functional component being operative to creating a storage read command as a protocol transport message in a memory of the computer, the storage read command being directed to the storage device and including a read command data structure and a read data buffer specifically associated therewith, the read data buffer including first protocol data constituting a protocol command, the read command data structure including a storage read command and predetermined read address information used to identify the storage read command as the protocol transport message; and
the second functional component is operative to:
1) access the read command data structure from the memory and test it to make a first determination that it contains the predetermined read address information;
2) based on the first determination, access the read data buffer from the memory and test it to make a second determination that it includes the identification data; and
3) based on the second determination and the protocol data in the read data buffer, (a) execute a protocol-controlled processing action with respect to the storage I/O commands, and (b) return a protocol response to the first functional component by creating and storing response data in the read data buffer and signaling a completion of the storage read command to the first functional component.

20. A data processing system according to claim 19, wherein the storage device is a block-oriented storage device and the predetermined address information includes a starting logical block address identifying a location of a block of storage space of the block-oriented storage device.

21. A data processing system according to claim 20, wherein starting logical block address is a prime-numbered address and the predetermined address information further includes an odd-numbered length value, and wherein the testing to make the first determination includes determining that both the prime-numbered address and the odd-numbered length value are present.

22. A data processing system according to claim 19, wherein the identification data includes a protocol signature value identifying the first protocol data as the protocol command and distinguishing communications of the command-response protocol from other communications that use like-organized transport messages.

23. A data processing system according to claim 19, wherein the second functional component is a lower-layer functional component operating at a lower layer of the storage I/O interface stack, and the first functional component is an intermediate-layer functional component operating at an intermediate layer of the storage I/O interface stack between the lower-layer functional component and an upper-layer functional component operating at an upper layer of the storage I/O interface stack, the intermediate-layer functional component being a protocol-aware layer operative to use the protocol transport message as a lower-layer transport message to communicate with the lower-layer functional component in response to a like-organized upper-layer transport message used by the upper-layer functional component to communicate with the intermediate-layer functional component.

24. A data processing system according to claim 23, wherein:
the intermediate-layer functional component is a protocol-aware virtualization module operative to map one or more storage extents defined at the upper layer to corresponding lower-layer storage extents defined at the lower layer and to create the lower-layer transport message to include lower-layer data location information by mapping distinct upper-layer data location information of the upper-layer transport message.

25. A data processing system according to claim 24, wherein:
the protocol command is a lower-layer probe command created by the virtualization module in response to receiving an upper-layer probe command used by the upper layer to probe for the possible presence of a non-protocol-aware virtualization module in the storage I/O stack, the lower-layer probe command including lower-layer probe data mapped from upper-layer probe data included in the upper-layer probe command, the upper-layer probe data having a matching relationship with upper-layer data location information in the upper-layer transport message carrying the upper-layer probe command;
the lower-layer functional component is operative in response to receipt of the lower-layer probe command to (1) determine that the lower-layer probe data has the matching relationship with the lower-layer data location information in the lower-layer transport message, and (2) in response to the determination, return a success response to the lower-layer probe command, the success response being forwarded to the upper-layer functional component, the success response being an alternative to a failure response that would have been returned if the lower-layer probe data did not have the matching relationship with the lower-layer data location information; and upper-layer functional component is operative to interpret the success response as evidence that the non-protocol-aware virtualization module is not present in the storage I/O stack.

26. A data processing system according to claim 25, wherein the upper-layer data location information includes a predetermined length value used to partly identify the upper-layer transport message as carrying the upper-layer probe command, and wherein the lower-layer functional component is further operative, for each received storage read command having the predefined length value, to check for the presence of the identification data and a protocol operation code of probe command to be processed by the lower-layer functional component.

27. A data processing system according to claim 24, wherein the lower-layer functional component is one of a set of lower-layer functional components among which the virtualization module is operative to distribute storage I/O commands, and correct processing of the storage I/O commands requires that each of the lower-layer functional components is capable of the protocol-controlled processing action, and wherein the virtualization module is operative to (a) utilize a plurality of like-organized lower-layer transport messages to communicate with respective ones of the set of lower-layer functional components, and (b) to provide an upper-layer protocol response to an upper-layer protocol command in the upper-layer transport message based on respective lower-layer responses from the lower-layer functional components.

28. A data processing system according to claim 27, wherein communicating with the lower-layer functional components includes querying their respective capabilities for the protocol-controlled processing action, the querying done in response to receiving a query command from the upper-layer functional component, and wherein the upper-layer protocol response is a success response to the query command only if results of the querying show that all the lower-layer functional components are capable of the protocol-controlled processing action.

29. A data processing system according to claim 27, wherein the storage device is one of a set of storage devices reachable via respective paths on which the lower-layer functional components respectively reside, and wherein the virtualization module is a mirroring component operative to send one or more duplicates of write-type storage I/O commands to the storage devices on the respective paths.

30. A data processing system according to claim 23, wherein the intermediate-layer functional component is a multipathing component and the lower-layer functional component is one of a set of lower-layer functional components among which the multipathing component can distribute storage I/O commands, the lower-layer functional components residing on distinct paths to the storage device, and wherein correct processing of the storage I/O commands requires that at least one of the lower-layer functional components is capable of the protocol-controlled processing action and that the multipathing component direct storage I/O commands requiring the protocol-controlled processing action to only those lower-layer functional components capable of the protocol-controlled processing action, and wherein the multipathing component is operative in response to receiving a query command from the upper-layer functional component to (a) utilize a plurality of like-organized lower-layer transport messages to communicate with respective ones of the lower-layer functional components to obtain respective lower-layer responses pertaining to their respective capabilities for the protocol-controlled processing action, and (b) if at least one of the lower-layer responses contain a success response, then return a successful query response in an upper-layer transport message, and otherwise return a failure query response in the upper-layer transport message.

31. A data processing system according to claim 23, wherein the lower-layer functional component is an encryption endpoint of the computer, and the protocol-controlled processing action includes encrypting and decrypting data as part of processing the storage I/O commands, the encrypting being performed on data written to the storage device, the decrypting being performed on data read from the storage device.

32. A data processing system according to claim 31, wherein the upper-layer functional component is a key controller module of the computer, and wherein the command-response protocol is a data encryption key management protocol used by the key controller module to provide a data encryption key to the encryption endpoint for use in the encrypting and decrypting of the data of the storage device.

33. A data processing system according to claim 19, wherein the second functional component is a lower-layer functional component operating at a lower layer of the storage I/O interface stack, and the first functional component is an upper-layer functional component operating at an upper layer of the storage I/O interface stack, and wherein the storage I/O interface stack further includes an intermediate-layer functional component operating at an intermediate layer of the storage I/O interface stack between the upper-layer functional component and the lower-layer functional component, the intermediate-layer functional component being a non-protocol-aware layer operative to (i) forward the protocol transport message to the lower-layer functional component without examining the read data buffer or itself responding to the upper-layer protocol command, (ii) forward a corresponding transport response from the lower-layer functional component to the upper-layer functional component without affecting contents of the read data buffer or modifying the transport response.

34. A data processing system according to claim 19, wherein the command-response protocol includes two distinct protocol commands both used in an initial phase of communications between the first and second functional components and both requiring a corresponding success response as a condition to the performing of the protocol-controlled processing action by the second functional component.

35. A data processing system according to claim 34, wherein the two distinct protocol commands include a handshake command and a query command, the handshake command used by the first functional component to identify the presence of the second functional component, and the query command used by the first functional component to obtain information from the second functional component regarding its capability for the protocol-controlled processing action.

36. A data processing system according to claim 19, wherein the protocol data includes a checksum used to protect integrity of the protocol data, the checksum being generated by a predetermined check function applied to the protocol data as included in the protocol command by the first functional component, and wherein the second functional component is operative to apply the predetermined check function to the protocol data as received by the second functional component to calculate a check function result indicating that the protocol data represents a valid protocol command.

* * * * *